(12) United States Patent
Lymberopoulos et al.

(10) Patent No.: US 8,851,108 B2
(45) Date of Patent: Oct. 7, 2014

(54) SAFETY VALVE AND METHOD OF USE

(75) Inventors: David Lymberopoulos, Houston, TX (US); Benjamin R. Matthews, Missouri City, TX (US)

(73) Assignee: SAFOCO, Inc., Houston, TX (US)

( * ) Notice: Subject to any disclaimer, the term of this patent is extended or adjusted under 35 U.S.C. 154(b) by 540 days.

(21) Appl. No.: 13/195,687

(22) Filed: Aug. 1, 2011

(65) Prior Publication Data

US 2012/0025114 A1 Feb. 2, 2012

Related U.S. Application Data

(63) Continuation-in-part of application No. 13/073,609, filed on Mar. 28, 2011.

(60) Provisional application No. 61/319,697, filed on Mar. 31, 2010, provisional application No. 61/356,506, filed on Jun. 18, 2010.

(51) Int. Cl.
*F16K 37/00* (2006.01)
*F16K 31/56* (2006.01)
*F16K 31/126* (2006.01)

(52) U.S. Cl.
CPC .............. *F16K 31/1262* (2013.01); *F16K 31/56* (2013.01); *F16K 37/0008* (2013.01)
USPC ........... 137/556; 251/61.4; 251/63.6; 73/744; 116/272; 116/277; 116/281; 116/283; 137/553

(58) Field of Classification Search
USPC .................... 251/14, 61.4, 63.6, 77, 284, 285; 137/72, 75, 77, 553, 554, 556, 557; 73/744; 116/272, 276, 277, 281, 283
See application file for complete search history.

(56) References Cited

U.S. PATENT DOCUMENTS

| 3,741,116 A | 6/1973 | Green et al. |
| 3,788,341 A | 1/1974 | Athy, Jr. et al. |
| 4,213,480 A | 7/1980 | Orum et al. |

(Continued)

FOREIGN PATENT DOCUMENTS

| EP | 0 647 770 A2 | 4/1995 |
| JP | 07-042856 | 2/1995 |
| WO | 02/25612 A1 | 3/2002 |

OTHER PUBLICATIONS

PCT Search Report and Written Opinion for International Application No. PCT/US2011/030167 dated Nov. 21,2011.

(Continued)

*Primary Examiner* — John K Fristoe, Jr.
*Assistant Examiner* — Marina Tietjen
(74) *Attorney, Agent, or Firm* — Patterson & Sheridan LLP

(57) ABSTRACT

Embodiments of a method of operating a safety valve and a safety valve system are provided. The valve system includes a valve, an actuator, a mechanical override, and an indicator. The actuator includes a fail-safe mechanism and the indicator is configured to indicate whether the fail-safe mechanism is operable during use of at least one of the actuator and the mechanical override. In one embodiment, a method of operating the safety valve includes actuating the valve into an open position and sending a signal to indicate that the fail-safe mechanism is operable to move the valve to the closed position, while the valve is in the open position.

11 Claims, 14 Drawing Sheets

(56) References Cited

U.S. PATENT DOCUMENTS

| | | | |
|---|---|---|---|
| 4,461,449 A | 7/1984 | Turner | |
| 4,527,429 A | 7/1985 | Combest et al. | |
| 4,667,570 A | 5/1987 | Jensen, Jr. et al. | |
| 4,744,386 A * | 5/1988 | Frazer | 137/315.31 |
| 5,097,857 A | 3/1992 | Mayhew | |
| 5,132,904 A | 7/1992 | Lamp | |
| 5,273,113 A | 12/1993 | Schultz | |
| 5,275,086 A | 1/1994 | Stallings, Jr. | |
| 5,335,730 A | 8/1994 | Cotham, III | |
| 5,490,564 A | 2/1996 | Schultz et al. | |
| 5,526,883 A | 6/1996 | Breaux | |
| 6,349,772 B2 | 2/2002 | Mullen et al. | |
| 6,412,510 B1 | 7/2002 | Johnson | |
| 6,435,282 B1 | 8/2002 | Robison et al. | |
| 6,450,477 B1 | 9/2002 | Young | |
| 6,772,718 B2 | 8/2004 | Allen | |
| 6,854,704 B1 | 2/2005 | Young | |
| 7,004,445 B2 | 2/2006 | Lymberopoulos | |
| RE39,583 E | 4/2007 | Upchurch | |
| 7,231,971 B2 | 6/2007 | McCalvin | |
| 2002/0112632 A1 | 8/2002 | Faibish | |
| 2002/0124889 A1 | 9/2002 | Sundararajan | |
| 2005/0087712 A1 | 4/2005 | Lymberopoulos | |
| 2005/0236594 A1 | 10/2005 | Lilly et al. | |
| 2006/0159569 A1 | 7/2006 | Biester | |
| 2010/0154894 A1 | 6/2010 | Kotapish et al. | |
| 2011/0036415 A1 | 2/2011 | Lymberopoulos | |
| 2011/0094752 A1 | 4/2011 | Hudson et al. | |
| 2011/0240126 A1 | 10/2011 | Lymberopoulos | |
| 2013/0008519 A1 | 1/2013 | Crawford | |

OTHER PUBLICATIONS

PCT International Search Report and Written Opinion for International Application No. PCT/US2012/047828.

Versa Series B Valves Bulletin B-2011, Versa Products Company, Inc., 2011, 8 Pages.

Rotowink Indicators, Norgren, 1996, 2 Pages.

* cited by examiner

SAFETY VALVE AND METHOD OF USE

CROSS-REFERENCE TO RELATED APPLICATIONS

This application is a continuation-in-part of U.S. patent application Ser. No. 13/073,609, filed Mar. 28, 2011, which claims benefit of U.S. Provisional Patent Application Ser. No. 61/319,697, filed Mar. 31, 2010, and U.S. Provisional Patent Application Ser. No. 61/356,506, filed Jun. 18, 2010, which applications are herein incorporated by reference in their entirety.

BACKGROUND OF THE INVENTION

1. Field of the Invention

Embodiments of the invention generally relate to a safety valve. More particularly, embodiments of the invention relate to a safe mode indication device for a safety valve actuator.

2. Description of the Related Art

Various designs of valve actuators exist that operate to open and close valves in a variety of uses. The petroleum industry utilizes these actuators to operate gate valves that incorporate a sliding gate within a valve body to selectively block fluid flow through tubing. Positioning gate valves along tubing at various locations controls and directs the flow of fluids through the tubing. An assembly known as a christmas tree includes these valves along with spools, pressure gauges, fittings, and/or chokes connected to the top of a well in order to direct and control the flow of formation fluids or production fluids from the well.

In operation, a valve stem extending from the valve body of the gate valve moves axially within the valve body in order to move the sliding gate between an open position and a closed position. A shaft within an actuator for the gate valve engages the valve stem to impart the axial movement to the valve stem. Typically, the actuator includes a spring to bias the shaft within the actuator such that the gate valve provides a fail-safe to the closed position. In this manner, force applied to the shaft of the actuator from either a hydraulic, pneumatic, or mechanical source, depending on the type of actuator, overcomes the bias of the spring to move the sliding gate to the open position. Other gate valve designs provide for the fail-safe in the open position or a fail-in-position which maintains the position of the sliding gate upon failure. If the shaft or a top shaft coupled to the shaft extends external to the actuator, the amount of the shaft extending from the actuator may serve as a visual indication as to whether the valve is in the open position or the closed position.

The actuators commonly used to open and close the gate valves include mechanical overrides that use a mechanical force, automatic actuators such as various designs of pneumatic or hydraulic actuators, or combination actuators having both a mechanical override and an automatic actuator. Since most automatic operations of the actuators have a maximum capability for applying force to the valve stem, the combination actuator permits additional opening/closing power on a temporary basis without having to remove the original automatic actuator. Inadvertent loss of pneumatic or hydraulic pressure to the automatic actuator closes the gate valve which can interrupt production and interfere with wellbore completion operations occurring through the valve. The combination actuator provides a back-up for automatic operation, allows for testing, and enables an operator to lock the valve in the open position using a handwheel assembly of the mechanical override during various wellbore completion operations.

The combination actuators described above, however, fail to provide a visual indication whether the valve has been actuated using the mechanical override, the automatic actuation, or both. Although the shaft extending from the valve may in some cases provide a visual indication that the valve is either open or closed, the visual indication does not communicate which actuation mechanism is being used to position the valve in the open or closed position or whether the valve is fully open or fully closed. The lack of this communication can be detrimental in various situations. For example, a valve operator may believe that a valve having a fail-safe closed mechanism has been automatically actuated into an open position, when in fact the valve may have been opened using the mechanical override. Since the mechanical override may also override the fail-safe closed mechanism, the operator is thus under the mistaken belief that the valve is operating in a safe mode. In the event of a shut-down, the valve will remain locked open and be prevented from failing or moving into the closed position. In another example, when using the mechanical override, it is critical that the handwheel assembly is completely rotated until the valve is fully open or fully closed. Only a few turns of the handwheel can offset the valve gate, and yet the appearance of the handwheel shaft extending from the actuator cannot communicate this slight offset. Thus when automatic operation occurs, the valve cannot be situated in a fully open or fully closed position, potentially causing leakage in the valve and un-even wear of the valve's seat and/or seals of the gate or body by fluid flow through the slightly offset valve.

Thus, there exists a need for an improved mechanical override for use with an actuator for a valve. There exists a further need for a valve having a mechanical override that provides a visual indication of the status and/or position of the valve, as well as which actuation mechanism is operating the valve, when the valve is operating in a safe mode, and/or when the mechanical override is intervening with the fail-safe mechanism.

SUMMARY OF THE INVENTION

Embodiments of the invention include a valve system. The valve system may comprise a valve, an actuator, a mechanical override, and an indicator. The actuator may include a fail-safe mechanism and may be configured to actuate the valve using fluid pressure. The mechanical override may be configured to actuate the valve using mechanical force and to override the fail-safe mechanism. The indicator may be configured to indicate whether the fail-safe mechanism is operable during use of at least one of the actuator and the mechanical override.

In one embodiment, a valve system may comprise a valve, an actuator, and an indicator. The actuator may include a fail-safe mechanism and may be operable to actuate the valve to an open position and a closed position. The indicator may be operable to indicate that the valve is movable to the closed position using the fail-safe mechanism when the valve is in the open position.

In one embodiment, a method of operating a valve may comprise providing a system having a valve, an actuator, a mechanical override, and an indicator. The actuator and the mechanical override may be operable to actuate the valve to an open position and a closed position. The method may include actuating the valve into the open position using the actuator, and sending a signal to indicate that the actuator is operable to move the valve to the closed position, while the valve is in the open position.

In one embodiment, an apparatus may comprise a housing having a bore disposed therethrough; a piston movable within the housing; a piston seal positioned between the piston and the housing and movable relative to the piston or the housing; a biasing member operable to move the piston within the housing to a first position; and a contact member operable to move the piston seal within the housing to a second position against the bias of the biasing member. The piston seal forms a seal with the piston and an inner surface of the bore when in the first position. The piston seal does not form a seal with the piston and the inner surface of the bore when in the second position.

In one embodiment, an indicator apparatus may comprise a housing having a bore disposed therethrough; a piston movable within the housing; a biasing member operable to move the piston to a first position; a contact member operable to move the piston to a second position against the bias of the biasing member; and an indicator coupled to the piston, wherein the indicator provides a signal viewable through an opening in the housing when the piston is moved to the first position and a different signal viewable through the opening when the piston is moved to the second position.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
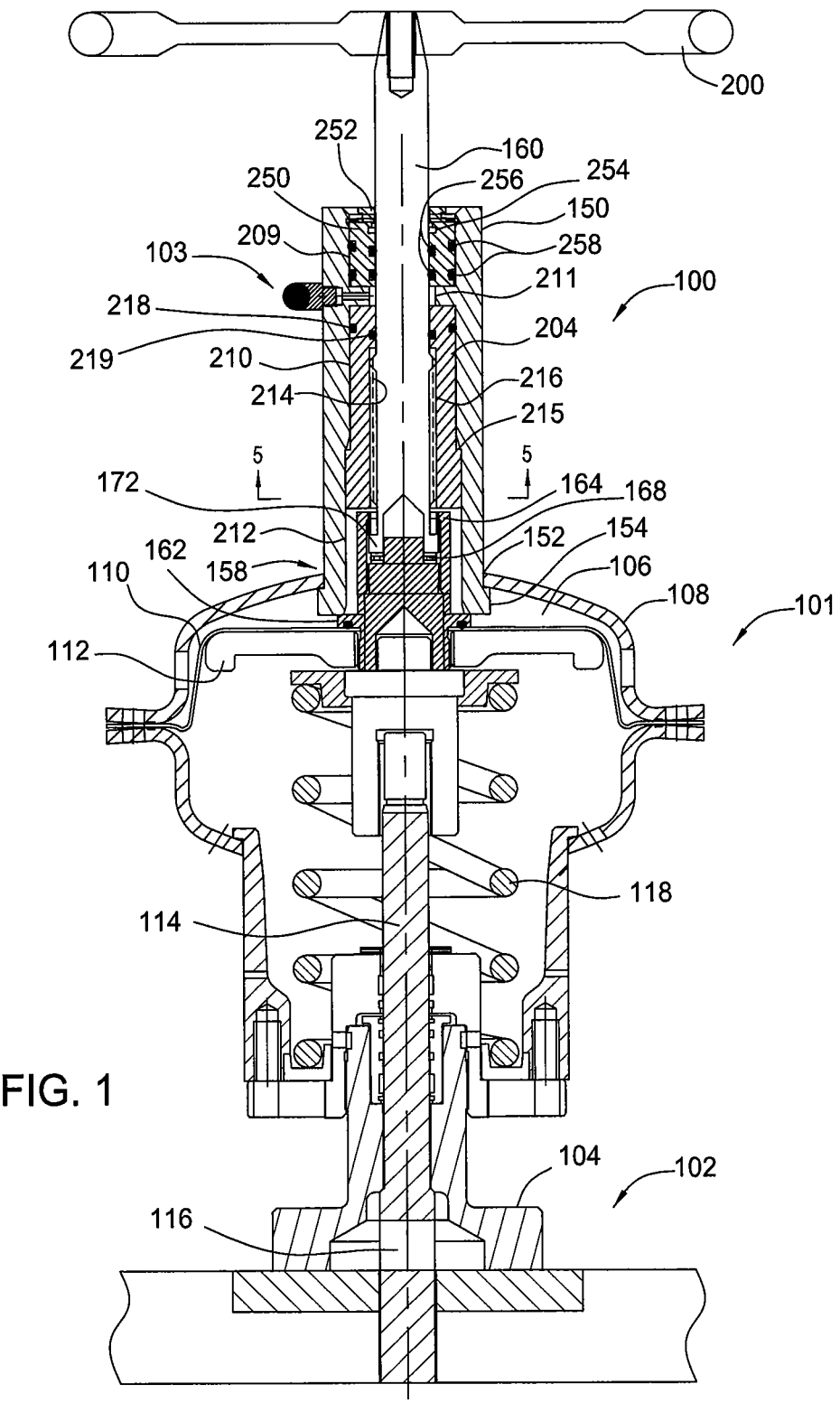
FIG. 1 is a sectional view of a gate valve, an actuator, a mechanical override, and a safe mode indicator according to one embodiment.
Figure 3:
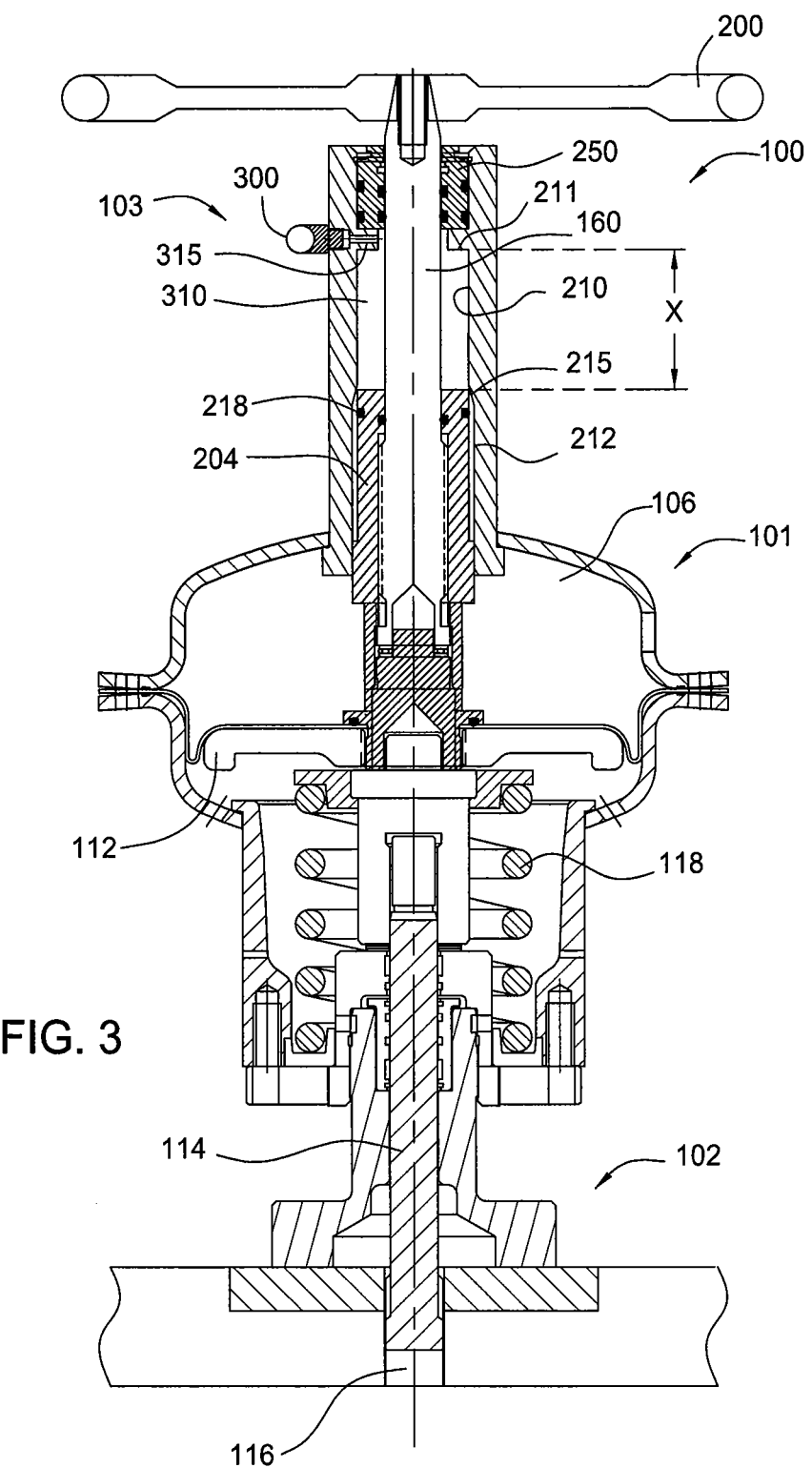
FIG. 3 is a sectional view of the gate valve in the open position after an automatic operation of the actuator and with the safe mode indicator indicating that the gate valve is operating in a safe mode.

FIG. 1 is a sectional view of a mechanical override 100, an actuator 101, a gate valve 102, and a safe mode indicator 103. The actuator 101 couples to a valve body 104 of the gate valve 102. A bonnet assembly can provide an interface between the gate valve 102 and the actuator 101. During an automatic operation of the gate valve 102, hydraulic or pneumatic pressure enters a chamber 106 of the actuator 101 defined by a cover 108 of the actuator 101 and a diaphragm 110 positioned over an operator member 112. The operator member 112 moves in response to the hydraulic or pneumatic pressure within the chamber 106 and against a biasing force supplied by a spring 118. A valve stem 114 coupled to a sliding gate 116 of the gate valve 102 moves in response to the movement of the operator member 112. In this manner, the automatic operation of the actuator 101 moves the sliding gate 116 of the gate valve 102 between a closed position shown in FIG. 1 and an open position as shown in FIG. 3.

In one embodiment, the actuator 101 may be selected from the pneumatic and hydraulic actuators described in detail in U.S. Pat. No. 6,450,477 which is herein incorporated by reference in its entirety. The actuator 101 may be selected from any other actuator known in the industry for moving the sliding gate 116 of the gate valve 102 between the open and closed positions by automatic operation.

When using the automatic operation of the actuator 101, the biasing force of the spring 118 is configured to act as a fail-safe mechanism. When the pressure in the actuator 101 is removed, inadvertently or otherwise, the spring 118 will move the gate valve 102 into a fail-safe closed position illustrated in FIG. 1. Although the mechanical override 100 may provide an additional means to actuate the gate valve 102 in the event of a failure, such as a loss of pressure, it may also override the fail-safe mechanism. The mechanical override 100 may prevent the spring 118 from moving the gate valve 102 into the fail-safe closed position. The gate valve 102 is operating in a safe mode when the fail-safe mechanism has not been overridden by the mechanical override and is not prevented or inhibited from moving into the fail-safe closed position. Therefore, the safe mode indicator 103 is configured to provide a signal, such as a visual indication, communicating to a valve operator that the valve is or is not operating in the safe mode. The signal from the safe mode indicator 103 may also communicate that (1) the valve will move to the fail-safe closed position in the event of a pressure loss in the actuator, (2) the valve has been automatically actuated into the open position, and/or (3) the mechanical override will not disable or interfere with the fail-safe mechanism.

As illustrated in FIG. 1, the mechanical override 100 is connected to the actuator 101 to provide a manual operation for moving the sliding gate 116 between open and closed positions. The mechanical override 100 includes a top shaft 160, a lever for manual rotation of the top shaft 160, such as a handwheel 200, a housing 150 having a longitudinal bore therethrough, a drive sleeve 204 rotationally locked to the housing 150, and a top seal cartridge 250. The housing 150 passes through an aperture 152 in the cover 108 of the actuator 101. A shoulder 154 formed by a portion of the housing 150 with an increased outer diameter provides a stop for positioning the housing 150 in the aperture 152 of the cover 108. The housing 150 may be secured to the cover 108 by any known means such as a thread or by welding.

The housing 150 includes an upper bore 209, an inner shoulder 211, a top bore 210, and a bottom bore 212. The inner shoulder 211 is disposed below the upper bore 209, the top bore 210 is disposed below the inner shoulder 211, and the bottom bore 212 is disposed below the top bore 210. The bottom bore 212 has an inner diameter greater than the top bore 210. A tapered shoulder 215 is located at the interface between the top bore 210 and the bottom bore 212.

The top seal cartridge 250 is disposed in the upper bore 209 and can be removed for replacement as a single unit without disassembling the actuator 101 or the mechanical override 100. The top seal cartridge 250 is preferably formed of a plastic-like material such as Delrin and is held in place by at least one retainer ring 252 which is preferably stainless steel. Accessibility to the retainer ring 252 without disassembly of the actuator 101 permits removal of the retainer ring 252 from the top of the housing 150, thereby allowing removal and replacement of the top seal cartridge 250. The top seal cartridge 250 contains dual reciprocating top shaft seals 256 and dual static seals 258 to ensure seal integrity and long life. The top seal cartridge 250 incorporates rod wiper 254 to keep a shaft sealing region therebelow clean of dirt, grease, and other contaminants for longer life of the top shaft seals 256. The rod wiper 254 is preferably made from Molythane 90 elastomer. These and other seals may be T-seals or other substantially elastomeric seals, such as O-ring seals.

The top shaft 160 extends through the longitudinal bore of the housing 150, the top seal cartridge 250, and the drive sleeve 204. The inner diameter of the inner shoulder 211 is greater than the outer diameter of the top shaft 160, but smaller than the outer diameter of the drive sleeve 204. The inner shoulder 211 permits axial movement of the top shaft 160 therethrough while providing a backstop for the drive sleeve 204. The top shaft 160 may also include a shoulder configured to engage an upper shoulder of the drive sleeve 204 to prevent removal of the top shaft 160 from the upper end of the drive sleeve 204.

The drive sleeve 204 is disposed in the housing 150 and is movable within the top bore 210 and the bottom bore 212. The drive sleeve 204 includes a threaded bore 216 that corresponds with a drive thread 214 on an outside surface of the top shaft 160. In one embodiment, the drive thread 214 is an Acme thread capable of functioning under loads and includes a small number of threads per inch, such as five, in order to decrease the work required to manually operate the actuator 101. The drive thread 214 permits unassisted rotation of the top shaft 160 with the handwheel 200. The threaded engagement permits relative axial movement between the top shaft 160 and the drive sleeve 204 within the housing 150. The outer diameter of the upper portion of the drive sleeve 204 is substantially the same as the inner diameter of the top bore 210 of the housing 150. One or more seals 218, such as o-rings, are provided on the outer diameter of the upper portion of the drive sleeve 204 to form a sealed engagement with the top bore 210 of the housing 150. One or more seals 219, such as o-rings, are provided on the inner diameter of the upper portion of the drive sleeve 204 to form a sealed engagement with the top shaft 160.

Figure 5:
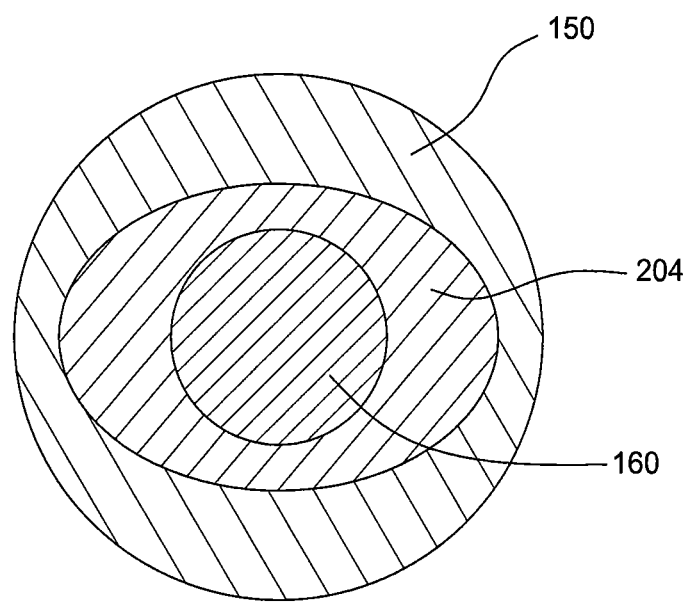
FIG. 5 is a cross-sectional view of the mechanical override along section line 5-5 in FIG. 1.

In one embodiment, the lower end of the drive sleeve 204 is configured to move axially relative to the bottom bore 212 of the housing 150 while being rotationally locked relative to the housing 150. Any known rotational locking assembly that prevents rotation of the drive sleeve 204 while permitting the drive sleeve 204 (and the top shaft 160) to move axially within the housing 150 during the automatic operation of the actuator 101 may be used. FIG. 5 illustrates a new rotational locking assembly by showing one embodiment of a cross-section at sectional line 5-5 in FIG. 1. FIG. 5 illustrates the outer diameter of the lower end of the drive sleeve 204 having an oval shape that corresponds to an oval shape of the inner diameter of the housing 150. The oval shaped diameters provide a physical interference that rotationally locks the drive sleeve 204 to the housing 150 without inhibiting axial movement of the drive sleeve 204 relative to the housing 150. The outer diameter of the drive sleeve 204 and the bore of the housing 150 may be formed in a number of ways known by one of ordinary skill in the art to prevent relative rotational movement while permitting relative axial movement. In one embodiment, the lower portion of the drive sleeve 204 may have one or more splines that extend into one or more corresponding longitudinal grooves formed in the bottom bore 212 of the housing 150 to permit relative axial movement but prevent relative rotational movement. In one embodiment, the lower portion of the drive sleeve 204 may be keyed to the bottom bore 212 with a pin that extends through corresponding longitudinal grooves in the drive sleeve 204 and the bottom bore 212.

A coupling assembly 158 prevents longitudinal separation between a retaining nut 162 secured to the operator member 112 and the top shaft 160 while isolating rotational movement of the top shaft 160 from the actuator 101 and the gate valve 102. The coupling assembly 158 includes a female coupler 164 and ball bearings 168. The lower end of the top shaft 160 rotates around the upper end of the retaining nut 162 and against the ball bearings 168. A bottom shoulder 172 on the top shaft 160 is secured against the ball bearings 168, which are positioned on the upper end of the retaining nut 162, by the female coupler 164. The female coupler 164 is connected to the upper end of the retaining nut 162 and includes an upper shoulder that engages the bottom shoulder 172 of the top shaft 160 to prevent separation of the shaft from the retaining nut 162 and thus the actuator 101 and the gate valve 102. The top shaft 160 freely rotates relative to the retaining nut 162 and eliminates the transmission of torque to the valve stem 114, the sliding gate 116, and/or components of the actuator 101 when using the mechanical override 100.

Embodiments of the invention do not require the coupling assembly connecting the top shaft 160 with the operator member 112. The top shaft 160 of the mechanical override 100 may contact and apply force directly to a portion of the actuator 101, such as the retaining nut 162 or the operator member 112 depending on the type of actuator used. For example, the end of the top shaft 160 may directly contact the upper end of the retaining nut 162. The solid retaining nut 162 may include a separate locking device to prevent the retaining nut 162 from unthreading from the operator member 112 since the top shaft 160 rotates during the manual operation of the mechanical override 100. Alternatively, other known rotation isolation means may be provided to prevent transference of the rotation of the top shaft 160 to other components within the actuator 101 and the gate valve 102.

Referring to FIG. 3, a chamber 310 is formed within the housing 150 between the top seal cartridge 250 and the drive sleeve 204. The chamber 310 is sealed at an upper end by the engagement between the top seal cartridge 250, the upper bore 209, and the top shaft 160, and at a lower end by the engagement between the drive sleeve 204, the top bore 210, and the top shaft 160. Fluid communication may be established between the chamber 310 and the actuator 101 when the drive sleeve 204 is moved into the bottom bore 212, as shown in FIG. 3. In particular, the seals 218 of the drive sleeve 204 are moved across the tapered shoulder 215 into the bottom bore 212, thereby releasing the sealed engagement with the top bore 210. When the drive sleeve 204 is located in the bottom bore 212 and fluid communication is established between the chamber 310 and the actuator 101, the gate valve 102 is operating in the safe mode. When the gate valve 102 is operating in the safe mode, the valve may be moved to the fail-safe closed position (shown in FIG. 1) by the fail-safe mechanism without interference from the mechanical override 100.

The safe mode indicator 103 communicates to a valve operator when the valve is operating in the safe mode. The safe mode indicator 103 includes an indication device 300, such as a sensor, that is connected to the housing 150. The indication device 300 is in fluid communication with the chamber 310 via an orifice 315 located through the housing 150. The pressure in the chamber 310 may be used to actuate the indication device 300 to communication a signal to the valve operator.

In one embodiment, when the chamber 310 is at a first pressure, the indication device 300 may communicate a first signal to the valve operator to indicate that the valve is not operating in the safe mode. When the chamber 310 is at a second pressure that is different than the first pressure, the indication device 300 may communicate a second signal that is different than the first signal to the valve operator to indicate that the valve is operating in the safe mode. The pressure in the chamber 310 may be the pressure directed into the actuator 101 when fluid communication is established between the chamber 310 and the actuator 101, as shown in FIG. 3. The pressure in the chamber 310 is communicated to the indication device 300 through the orifice 315 to actuate the indication device 300. In one embodiment, the first and/or second pressures may be in a range from about 0 PSI to about 80 PSI, 150 PSI, or greater. In one embodiment, the first and/or second signals may be a visual indication, such as a colored light or marker, an auditory indication, an electrical indication or signal, and any other type of signal known to one of ordinary skill.

In one embodiment, the indication device 300 may be any commercial sensor, such as a pressure sensor, that can be used to indicate a pressure change in the chamber 310. In one embodiment, the indication device 300 may be a Rotowink Indicator, commercially available through Norgen Ltd. The Rotowink Indicator is a spring-loaded device actuated by air pressure for use in visual monitoring of pneumatic or fluidic circuits. The device uses two contrasting colors (e.g. black, red, yellow, green) on a rotating ball that can be viewed from any angle to indicate the presence or absence of pressure.

The operation of the invention illustrated in FIGS. 1, 2, 3, and 4 will now be described. FIG. 1 illustrates the gate valve 102 in the fail-safe closed position. The spring 118 provides a force configured to bias the valve stem 114, the operator member 112, the top shaft 160, and the drive sleeve 204 in an upward direction, thereby positioning the sliding gate 116 in the closed position. Seating of the sliding gate 116 in the closed position limits the upward axial movement of the top shaft 160 and the drive sleeve 204. The mechanical override 100 is in an un-actuated position and does not interfere with the closing of the gate valve 102. The bias of the spring 118 raises the top shaft 160 to an extended position providing a visual indication that the gate valve 102 is in the closed position. The safe mode indicator 103 may provide a first visual indication that the gate valve 102 is not automatically actuated into the operating safe mode and/or the chamber 310 is not pressurized or has experienced a pressure change.

Figure 2:
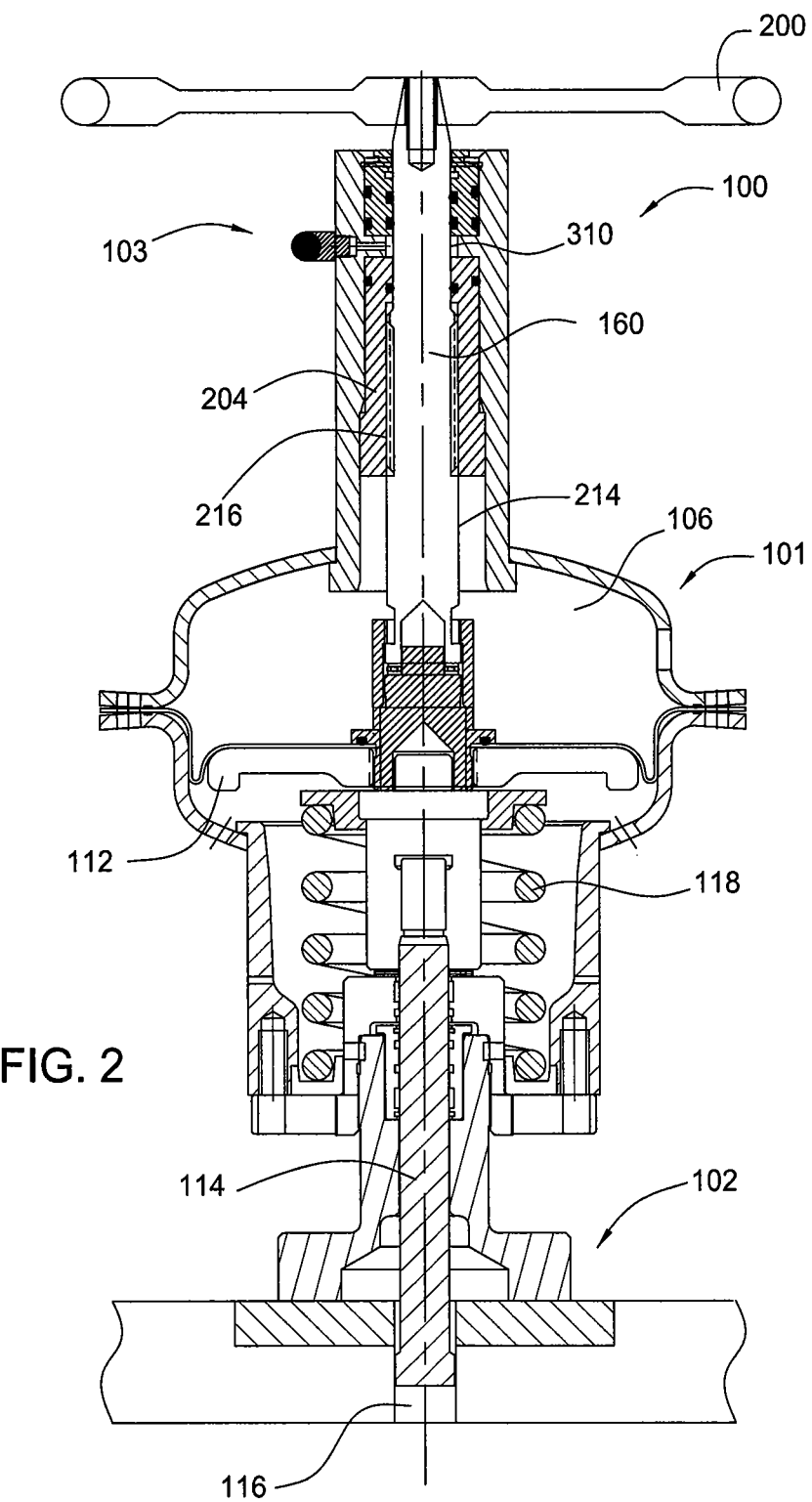
FIG. 2 is a sectional view of the gate valve in an open position after a manual operation of the mechanical override.

FIG. 2 illustrates the gate valve 102 in an open position after a manual operation the actuator 101 using the mechanical override 100. To move the sliding gate 116 to the open position using the mechanical override 100, the valve operator manually turns the handwheel 200 to provide rotation to the top shaft 160. Rotation of the handwheel 200 rotates the top shaft 160 to advance the top shaft 160 through the drive sleeve 204 across the length of the drive thread 214. As the top shaft 160 rotates, the top shaft 160 advances through the drive sleeve 204 until the upper portion of the drive thread 214 is located at the lower portion of the threaded bore 216 of the drive sleeve 204. During the manual operation, the inner shoulder 211 provides the backstop that prevents the drive sleeve 204 from moving relative to the housing 150. The manual rotation of the handwheel 200 mechanically advances the top shaft 160 through the housing 150 to either directly or indirectly axially move the valve stem 114 to place the gate valve 102 in the open position. The top shaft 160 is mechanically driven against the bias of the spring 118, thereby compressing the spring 118. The top shaft 160 lowers during the manual operation to a retracted position and provides a visual indication that the gate valve 102 is in the open position. The valve operator may also check the safe mode indicator 103 to determine whether the gate valve 102 is operating in the safe mode. The pressure in the chamber 310 should not have significantly changed during the operation of the gate valve 102 from the fail-safe closed position, shown in FIG. 1, to the open position by manual operation, shown in FIG. 2. Thus, the safe mode indicator 103 communicates the same first visual indication to the valve operator, which has not changed by the mechanical operation of the gate valve 102. The safe mode indicator 103 may therefore indicate that the gate valve 102 is not operating in the safe mode, has not been automatically actuated, has been actuated (at least partially) using the mechanical override 100, and/or may be prevented from moving into the fail-safe closed position.

FIG. 3 illustrates the gate valve 102 in the open position after an automatic operation of the actuator 101. Pressure is directed into the chamber 106 of the actuator 101 to overcome the bias of spring 118 and advance the top shaft 160, the drive sleeve 204, the operator member 112, and the valve stem 114 in a downward direction to position the sliding gate 116 into the open position. The top shaft 160 and the drive sleeve 204 are moved together axially within the bore of the housing 150 until the seals 218 on the drive sleeve 204 are moved across the tapered shoulder 215 and into the bottom bore 212. Fluid communication is established between the chamber 310 and the chamber 106. The pressure in the chamber 106 is communicated to the indication device 300 via the orifice 315, thereby actuating the indication device 300. The pressure change in the chamber 310 actuates the safe mode indicator 103 to communicate a second visual indication that is different than the first visual indication. Since the top shaft 160 also lowers during the automatic operation to the retracted position and provides a visual indication that the gate valve 102 is in the open position, the valve operator may use the safe mode indicator 103 to determine whether the gate valve 102 is operating in the safe mode. The second visual indication may therefore indicate that the gate valve 102 is operating in the safe mode, has not been mechanically actuated, has been automatically actuated, and/or will move into the fail-safe closed position upon release of pressure in the actuator 101. When operating in the safe mode, the upper end of the drive sleeve 204 is located at least a distance X from the inner shoulder 211 of the housing 150. In this position, the mechanical override 100 will not disable or interfere with the fail safe mechanism. When the pressure in the actuator 101 is released, the drive sleeve 204 is located a sufficient distance from the inner shoulder 211 so as not to limit upward axial movement of the top shaft 160 and thus the valve stem 114 and the sliding gate 116. In this manner, the sliding gate 116 may move into the fail-safe closed position.

Figure 4:
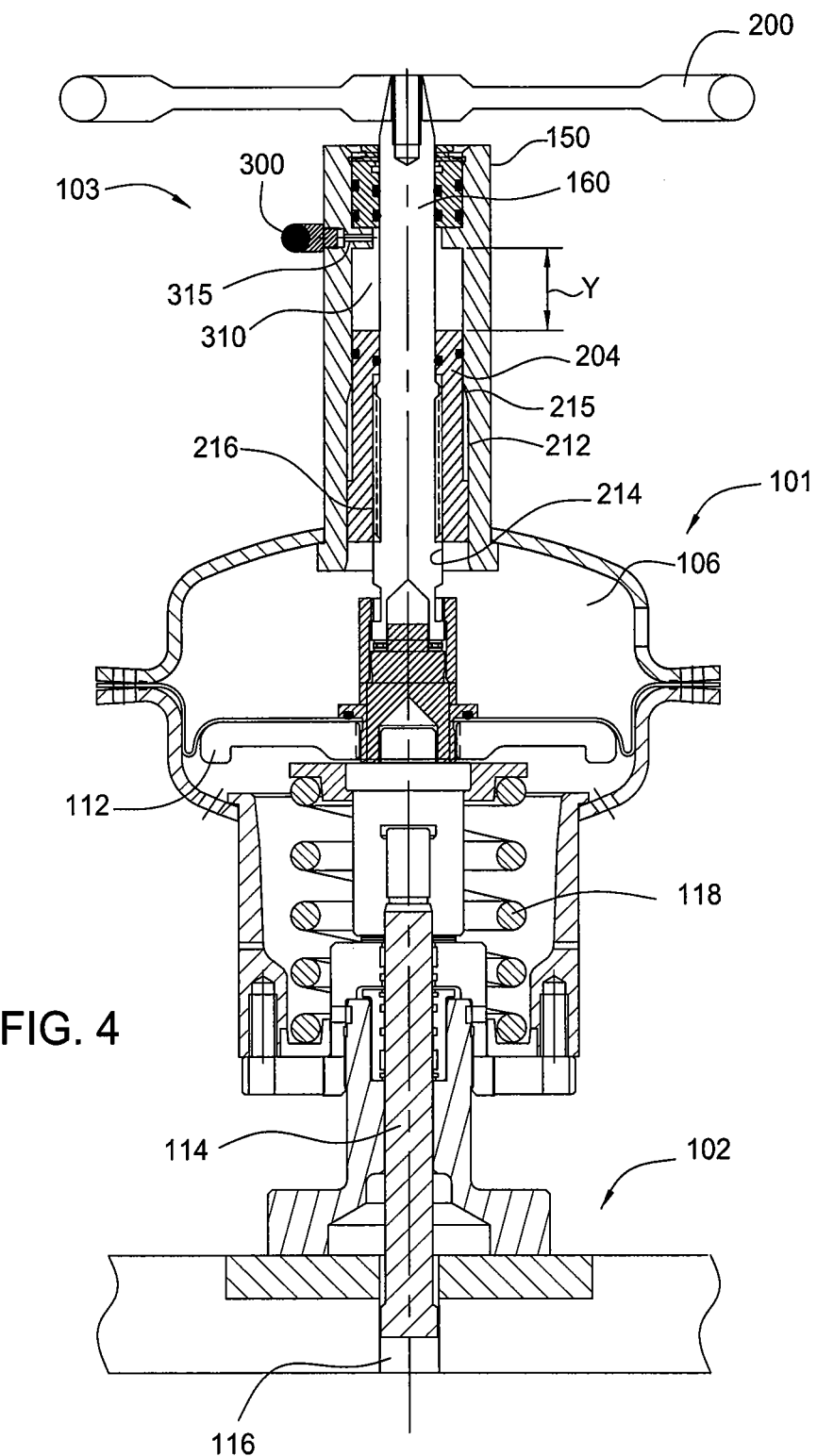
FIG. 4 is a sectional view of the gate valve in the open position after the automatic operation of the actuator, the mechanical override having been partially actuated, and the safe mode indicator indicating that the gate valve is not operating in the safe mode.

FIG. 4 illustrates the gate valve 102 in an open position after an automatic operation of the actuator 101 and a partial operation of the mechanical override 100. Before and/or after automatic actuation of the gate valve 102, the mechanical override 100 may be actuated at least partially, inadvertently or otherwise. If the handwheel 200 has been rotated one or more times, the top shaft 160 and the drive sleeve 204 will move relative to each other in an offset position illustrated in FIG. 4. When in the offset position and if the valve is automatically actuated, then the upper end of the drive sleeve 204 may be positioned a distance Y from the inner shoulder 211, which would prevent the gate valve 102 from moving to the fail-safe closed position. In one embodiment, the distance Y may be any distance that is less than the distance X identified in FIG. 3. When the pressure in the actuator 101 is released, the upper end of the drive sleeve 204 would backstop on the inner shoulder 211 before the sliding gate 116 closes, and limit the upward axial movement necessary to move the sliding gate 116 into the fail-safe closed position. Depending on the amount of offset between the drive sleeve 204 and the top shaft 160, the sliding gate 116 may be located in a partially open/closed position. Also, when in the gate valve 102 is automatically actuated and the drive sleeve 204 is located the distance Y from the inner shoulder 211, the chamber 310 remains isolated from fluid communication with the chamber 106 by the seals 218 and 219. Any slight actuation of the mechanical override 100 may offset the top shaft 160 and the drive sleeve 204 enough to prevent the seals 218 from moving across the tapered shoulder 215 during automatic actuation.

Since the top shaft 160 may still visually indicate that the valve 102 is in the open position in FIG. 4, the valve operator may also check the safe mode indicator 103 to determine whether the gate valve 102 is operating in the safe mode. The pressure in the chamber 310 should not have significantly changed since it is isolated from the chamber 106 by the seals 218 and 219. Thus, the safe mode indicator 103 communicates the same first visual indication to the valve operator, which has not changed by the automatic actuation of the gate valve 102. The safe mode indicator 103 may therefore indicate that the gate valve 102 is not operating in the safe mode, has been actuated (at least partially) using the mechanical override 100, and/or may be prevented from moving into the fail-safe closed position. While the actuator 101 is pressurized, the valve operator may rotate the handwheel 200 to advance the drive sleeve 204 into the bottom bore 212 until the gate valve 102 is operating in the safe mode. The valve operator may rotate the handwheel until the safe mode indicator 103 changes from the first visual indication to the second visual indication, e.g. when fluid communication is established between the chamber 106 and the chamber 310, to ensure that the gate valve 102 is operating in the safe mode. Alternatively, the valve operator may release the pressure in the actuator 101 to permit the drive sleeve 204 to backstop against the inner shoulder 211, and then rotate the handwheel to move the mechanical override 100 into the un-actuated position so that the top shaft 160 and the drive sleeve 204 are not in an offset position as described above. The actuator 101 may be re-actuated automatically so that the safe mode indicator 103 indicates that the valve is operating in the safe mode.

Figure 6:
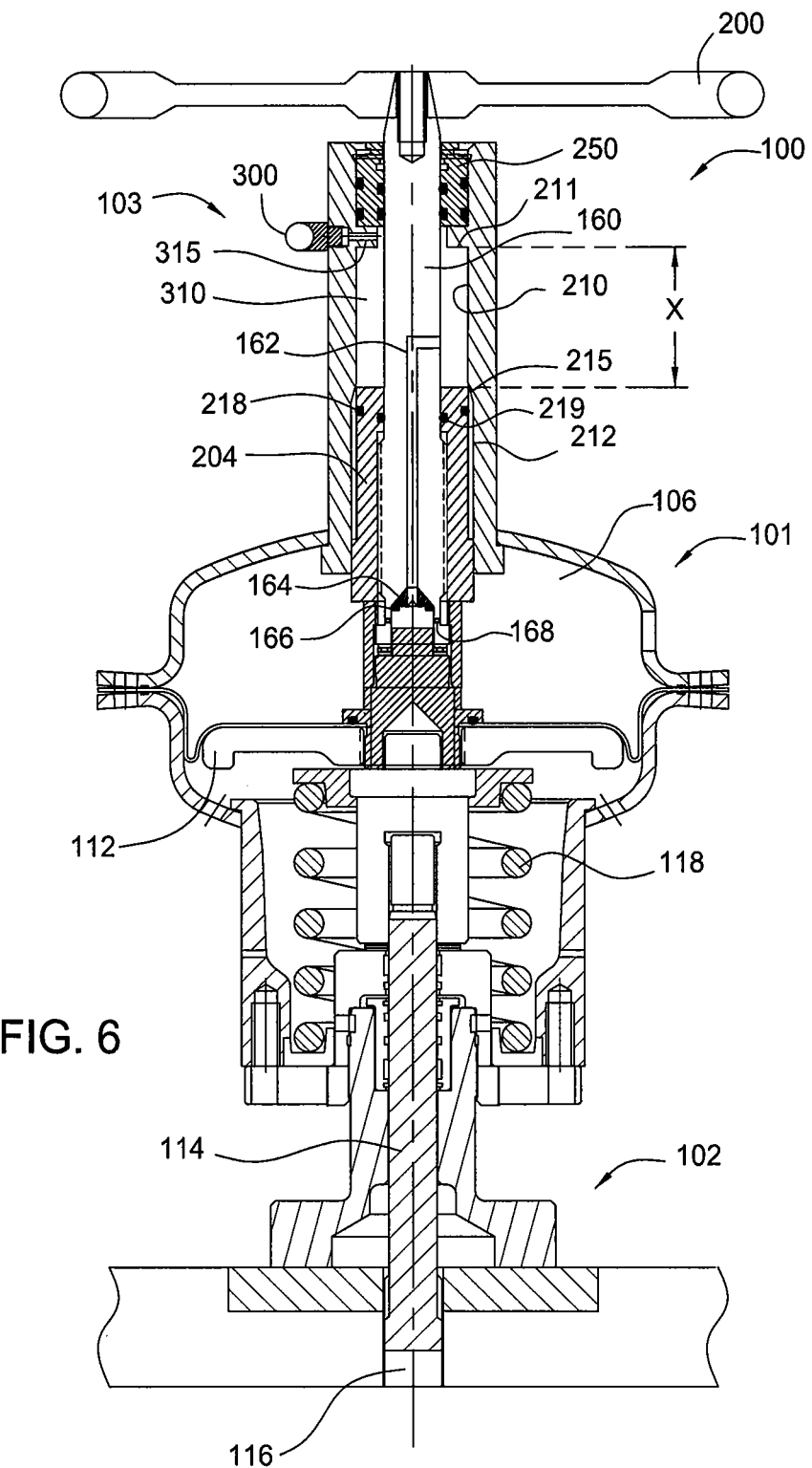
FIG. 6 is a sectional view of the gate valve in an open position after an automatic operation of the actuator.

FIG. 6 illustrates the gate valve 102 in an open position after an automatic operation of the actuator 101 according to one embodiment. The gate valve 102, the actuator 101, and the mechanical override 100 illustrated in FIG. 6 may each include the embodiments described above with respect to FIGS. 1-5. FIG. 6 further illustrates a bore 162 disposed through the top shaft 160, a check valve 164 disposed in a lower end of the top shaft 160 and in communication with the bore 162, and a retaining member 166 coupled to the top shaft 160 to support the check valve 164 in the lower end of the top shaft 160. In one embodiment, the bore 162 may be disposed through the top shaft 160 in any manner known by one of ordinary skill in the art to allow fluid communication between the chamber 310 and the chamber 106. In one embodiment, the check valve 164 may be any type of valve known by one of ordinary skill in the art, such as a one-way valve, that is operable to control the flow of fluid through the bore 162 in either direction. In one embodiment, the retaining member 166 may be any type of member known by one of ordinary skill in the art, such as a retainer ring, that is operable to maintain the check valve 162 in engagement with the top shaft 160 and/or the bore 162. The top shaft 160 illustrated in FIG. 6 may be used in any of the embodiments described with respect to FIG. 1-5.

In operation, the bore 162 may be configured to relieve any fluid pressure that is located in the chamber 310, which may cause a pressure lock and prevent the fail-safe mechanism from closing the gate valve 102. For example, when the gate valve 102 is operating in the safe mode as illustrated in FIG. 6, the chamber 310 is in fluid communication with the chamber 106 of the actuator 101 and is filled with pressurized fluid. As the pressure in the chamber 106 is reduced, the spring 118 begins to move the gate valve 102 into the closed position, as illustrated in FIG. 1, and the chamber 310 is sealed upon engagement of the seals 218 with the inner surface of the top bore 210. Any fluid that may be retained in the chamber 310 is relieved through the bore 162 into the chamber 106. In one embodiment, the fluid may be forced through the bore 162 and the check valve 164 under its own pressure and/or as it is pressurized as the volume of the chamber 310 is reduced by movement of the drive sleeve 204 toward the shoulder 211 via the spring 118. The check valve 164 may allow fluid to flow from the upper end of the top shaft 160, through the bore 162 and into the chamber 106, and prevent fluid from flowing into the bore 162 and thus into the chamber 310 from the lower end of the top shaft 160. In one embodiment, the top shaft 160 may include one or more ports 168 located adjacent to the outlet of the check valve 164 to assist with venting fluid pressure into the chamber 106. In one embodiment, one or more seals 219 may be situated between the top shaft 160 and the drive member 204 to prevent any unintended leak paths from communicating fluid to the bore 162 during operation of the gate valve 102.

Figure 7A:
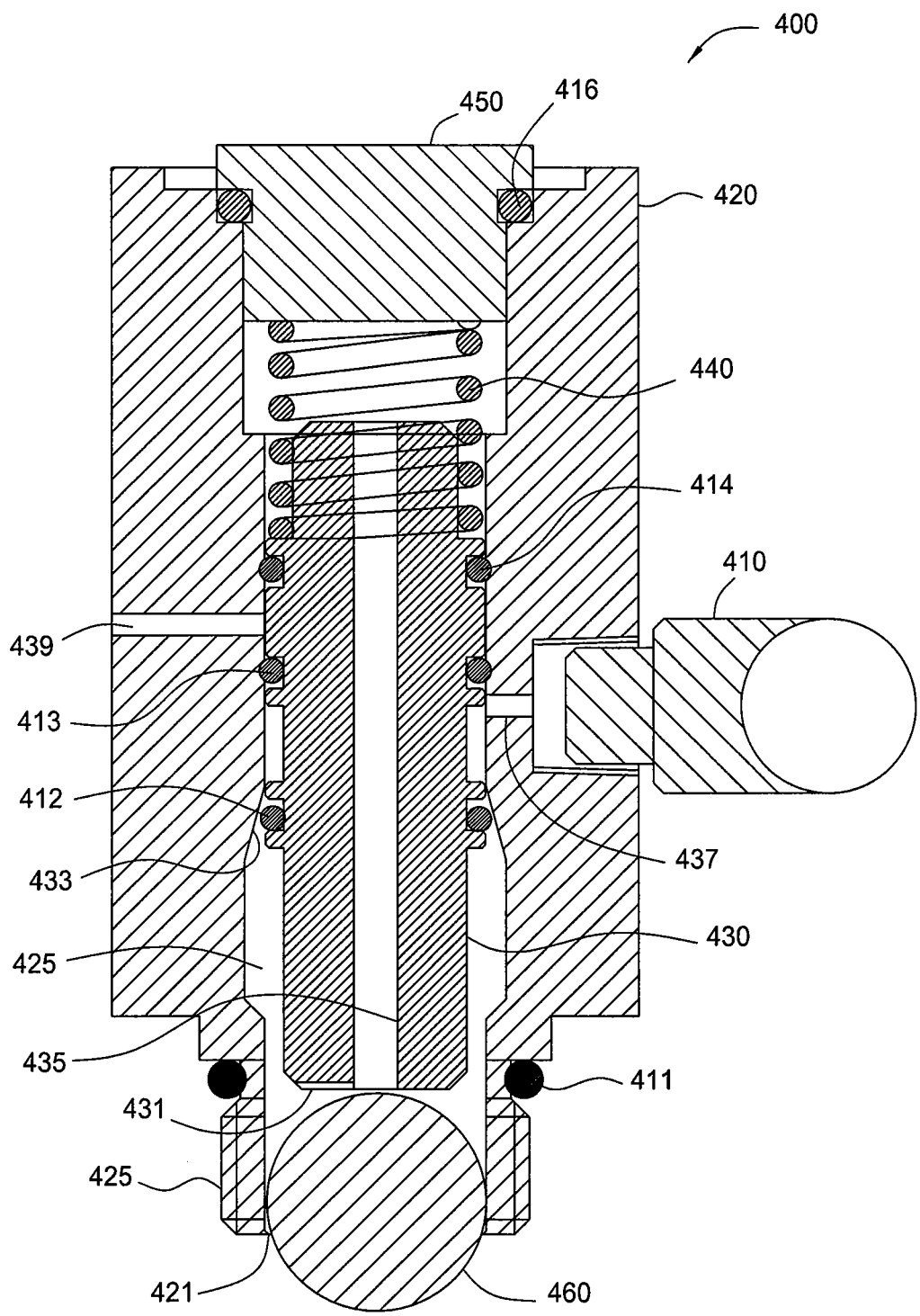
FIGS. 7A and 7B are sectional views of a safe mode indicator according to one embodiment.
Figure 7B:
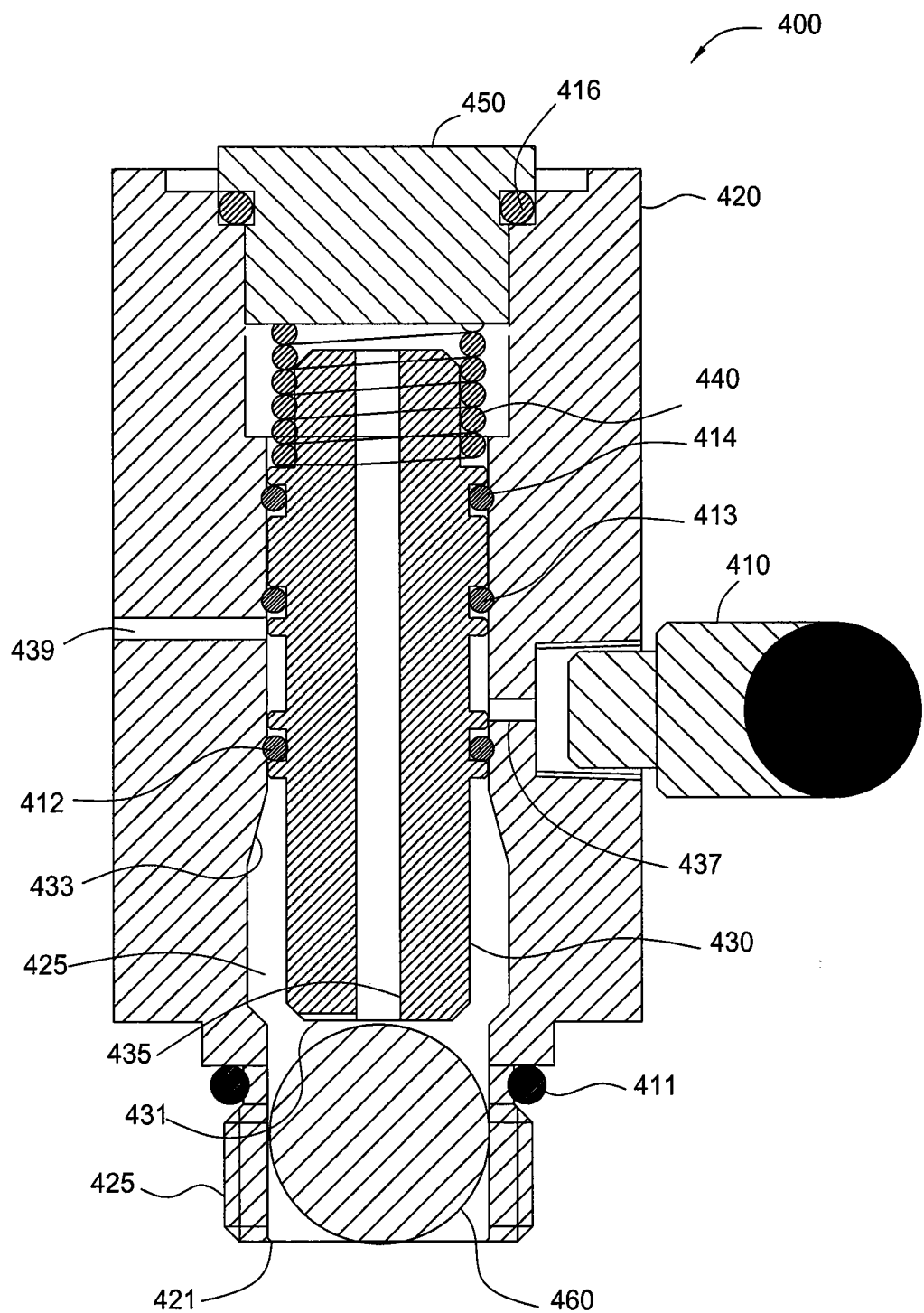

FIGS. 7A and 7B illustrate a safe mode indicator 400 for use with the embodiments described herein. The safe mode indicator 400 is similar to the indicator 103 and is operable to indicate whether the valve 102 and/or actuator 101 are operating in a safe mode. The safe mode indicator 400 may communicate that (1) the valve will move to the fail-safe closed position in the event of a pressure loss in the actuator, (2) the valve has been automatically actuated into the open position, and/or (3) the mechanical override will not disable or interfere with the fail-safe mechanism.

The safe mode indicator 400 includes an indication device 410, a housing 420, a piston 430, a biasing member 440, a plug member 450, and a ball member 460. The safe mode indicator 400 is operable as an indication mechanism as described herein, and/or is generally operable as a three-way, two-position valve mechanism. In particular, a force is applied to the ball member 460 sufficient to move the piston 430 to a closed position against the bias of the biasing member 440, thereby closing fluid communication between port 437 and an opening 421 in the end of the housing 420 adjacent to the ball member 460. When in the closed position the port 437 is in fluid communication with port 439. When no force or a force less than the biasing force of the biasing member 440 is applied to the ball member 460, the biasing member 440 will move the piston 430 to an open position where fluid communication is established between the opening 421 and the port 437. When in the closed position the port 437 is not in fluid communication with port 439.

The indication device 410 may be the same as the indication device 300 described above. The indication device 410 is operable to provide a signal or other indication when it measures or senses a predetermined amount of pressure or change in pressure. The signal or indication may be communicated to a valve operator by any number of ways known in the art, including visual, auditory, and/or electronic communication. In one embodiment, the indication device 410 may be a pressure sensor. The indication device 410 is coupled to the housing 420, such as by a threaded engagement, so that it is in fluid communication with a bore 425 of the housing 420 via the port 437.

The housing 420 may be a tubular, round, or hexagonally shaped member with the bore 425 disposed through the body of the housing 420, and may be formed from metallic materials, such as stainless steel, aluminum, or other similar materials. The ball member 460, the piston 430, and the biasing member 440 may be disposed in the bore 425 through an end of the housing 420, which is closed and sealed with the plug member 450 and seal member 416. The plug member 450 may be threadedly coupled to the end of the housing 420. The ball member 460 may be of sufficient diameter such that a portion of the ball member 460 extends out of the opening 421 of the housing 420 but cannot fit entirely through opening 421. Inner edges of the opening 421 may be tapered to engage the outer surface of the ball member 460 and prevent removal of the ball member 460 through the opening 421. Although shown in the form of a spherical member, the ball member 460 may include other shaped members configured to transmit a force to the piston 430 as described herein. Other contact members, such as the ball member 460, that are easily replaceable wear may be used to move or transmit a force to the piston 430, including but not limited to a pin member, a lever, a button, a switch, a cam member, a piston member, a valve member, a piloted or air valve, and/or other mechanically, hydraulically, pneumatically, and/or electrically operated contact members. In one embodiment, instead of the ball member 460, a portion of the piston 430, such as an enlarged end portion of the piston 430, may extend through the opening 421 of the housing 420 for contact with the drive sleeve 204 as further described herein.

The opposite portion of the ball member 460 engages an end of the piston 430. The piston 430 may include a tubular, round, or hexagonally shaped member having a bore 435 disposed through the body of the piston 430. The opposite end of the piston 430 may include a shoulder for supporting and contacting the biasing member 440, which is disposed between the piston 430 and the plug member 450. The biasing member 440 may include a spring or other similar biasing mechanism to force the piston 430 and the ball member 460 in one direction toward the opening 421 of the housing. One or more seal members 412, 413, 414 are disposed on the outer surface of the piston 430, and sealingly engage the inner surface of the bore 425. The seal members 412, 413, 414 may be disposed in recesses or shoulder portions formed on the outer surface of the piston 430. In one embodiment, one or more of the seal members 412, 413, 414 may be supported by the inner surface of the housing 420 and in sealing engagement with the piston 430, which may be movable relative to the seal members to open and close fluid communication to the ports 437, 439. For example, one or more of the seal members 412, 413, 414 may be statically supported within one or more recesses in the inner surface of the housing 420 such that they sealingly engage the piston 430, and the piston 430 may include one or more recess in its outer surface that are moved relative to the seal members to bypass one or more of the seal members as the piston 430 is moved by the ball member 460 and the biasing member 440.

When the safe mode indicator 400 is in the open position, as illustrated in FIG. 7A, the piston 430 and thus the seal member 412 is moved within or past a tapered surface 433 or area of the bore 425 to open fluid communication between the opening 421 of the housing 420 and the port 437, effectively bypassing the seal member 412. Fluid pressure thus may be communicated to the indication device 410 via the opening 421 of the housing 420. When in the open position, seal member 413 seals against the inner surface of the bore 425 and prevents fluid communication to port 439. A slot 431 is formed in the end of the piston 430 to allow uninhibited fluid communication through bore 435 to the opposite end of the piston 430. The bore 435 is operable equalize fluid pressure or prevent significant pressure differentials across the piston 430 within the bore 425. Seal member 414 prevents fluid communication to ports 437, 439 from the opposite end of the piston 430.

When the safe mode indicator 400 is in the open position, as illustrated in FIG. 7A, the piston 430 and thus the seal member 412 is moved past a tapered surface 433 or other increase in the inner diameter of the bore 425 to create a bypass around the seal member 412 and open fluid communication between the opening 421 of the housing 420 and the port 437. When in the open position, seal member 413 prevents fluid communication to port 439.

When the safe mode indicator 400 is in the closed position, as illustrated in FIG. 7B, the piston 430 and thus the seal member 412 is moved into a reduced inner surface portion of the bore 425 relative to the tapered surface 433 so that the seal member 412 sealingly engages the inner surface and closes fluid communication between the opening 421 of the housing 420 and the port 437. When in the closed position, seal member 413 is moved to the opposite side of the port 439 to thereby open fluid communication between ports 437 and 439. Port 439 may be disposed through the body of the housing 420 to communicate with the atmosphere surrounding the safe mode indicator 400. Any pressure within the port 437 and the area between seal members 412, 413 may be exhausted to atmosphere via port 439.

The operation of the safe mode indicator 400 with the mechanical override 100, the gate valve 102, and the actuator 101 is illustrated in FIGS. 8, 9, 10, and 11. The mechanical override 100, the gate valve 102, and the actuator 101 are substantially similar as described above with respect to FIGS. 1-6, and the similar components are identified with the same reference numerals. The main differences are the use of the safe mode indicator 400, the housing 150 having a substantially uniform inner diameter and/or not requiring the tapered inner shoulder 215 as shown in FIGS. 3 and 4 for example, and the drive sleeve 204 having a substantially uniform outer diameter and/or not requiring seal 218 disposed on its outer diameter, also as shown at least in FIGS. 3 and 4 for example.

Figure 8:
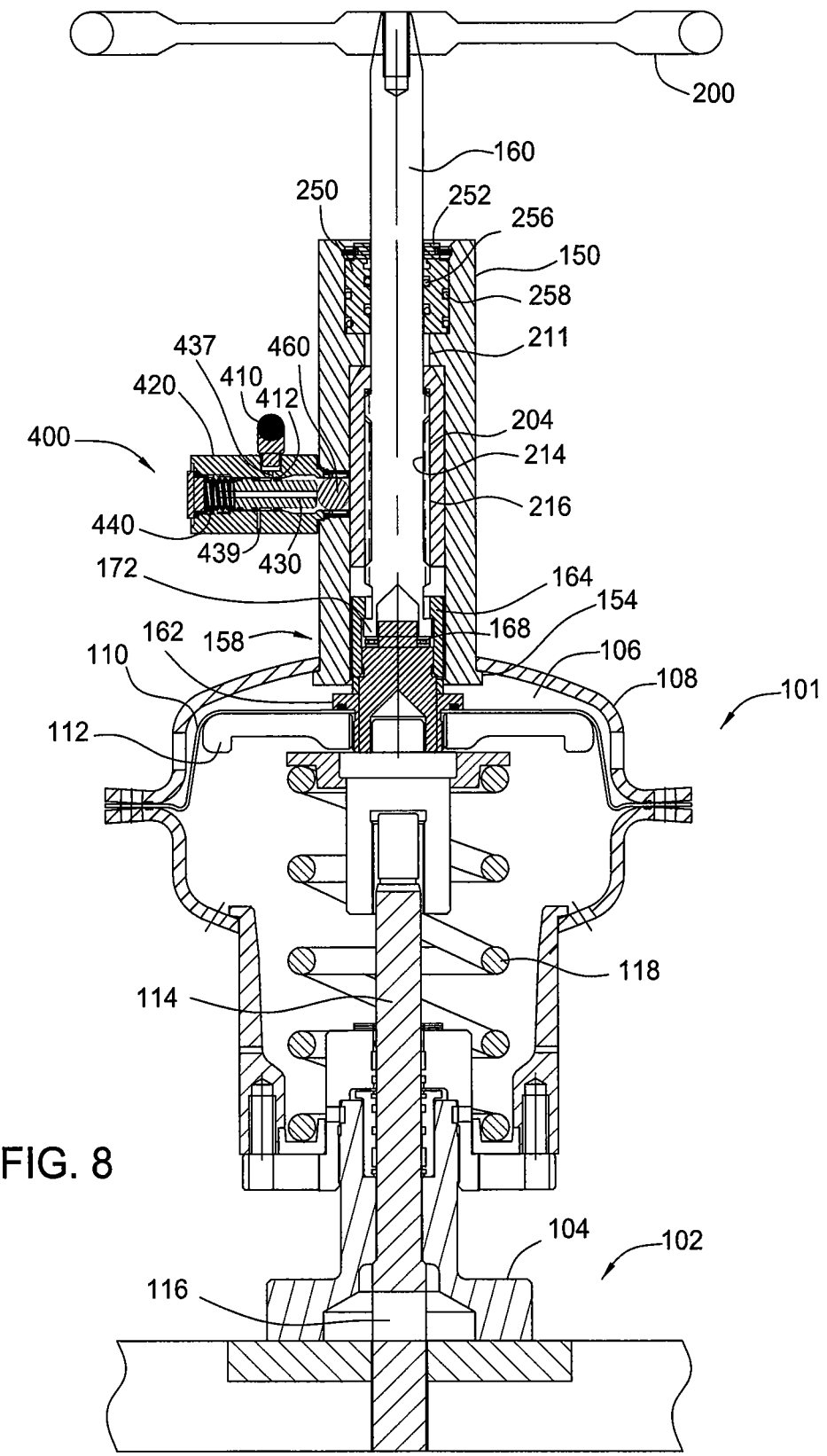
FIG. 8 is a sectional view of a gate valve, an actuator, a mechanical override, and a safe mode indicator according to one embodiment.

As illustrated in FIG. 8, the safe mode indicator 400 is coupled to the housing 150. In particular, a connector portion 425 (see FIGS. 7A&B) of the safe mode indicator 400 may be threadedly coupled to the housing 150, and a seal member 411 (see FIGS. 7A&B) may provide a sealed engagement between the safe mode indicator 400 and the housing 150. The safe mode indicator 400 may be coupled to the housing 150 so that a portion of the ball member 460 extends into the chamber 310 of the housing 150 such that it may contact the drive sleeve 204. The opening 421 of the housing 420 of the safe mode indicator 400 is also in fluid communication with the chamber 310 of the housing 150 within which the drive sleeve 204 is located. In this manner, as the drive sleeve 204 moves axially within the housing 150, it will contact and be moved from contact with the ball member 460, thereby moving the safe mode indicator 400 into the open and closed positions.

When contacting the outer surface of the drive sleeve 204, the ball member 260 and the piston 430 are forced in one direction into the housing 420 (and away from housing 150) against the bias of the biasing member 440. The seal member 412 is moved toward the tapered surface 433 and into sealing engagement with the inner surface of the bore 425 to isolate fluid communication to port 437 and the indication device 410. The safe mode indicator 400 is in the closed position, and the indication device is in fluid communication with the atmosphere and may sense or measure the pressure in the atmosphere via ports 437 and 439. When in the closed position, the indication device 410 may communicate a signal or other indication that the actuator 101 and the valve 102 are closed and/or are not operating in the safe mode.

When not contacting the outer surface of the drive sleeve 204, the ball member 260 and the piston 430 are forced toward the housing 150 by the biasing member 440. The seal member 412 is moved out of the tapered surface 433 and removed from sealing engagement with the inner surface of the bore 425 to open fluid communication to port 437 and the indication device 410. The safe mode indicator 400 is in the open position, and the indication device 410 is in fluid communication with the chamber 310 and thus chamber 106, and may sense or measure the pressure or change in pressure in the chambers 310, 106 via the opening 421, the bore 425, and the port 437. The ball member 460 may be positioned and movable within the pressurized environment but does not create any seals to prevent fluid communication between the chambers 310, 106 and the bore 425 of the housing 150. When in the open position, the indication device 410 may communicate a signal or other indication that the actuator 101 and the valve 102 are open and/or are operating in the safe mode.

The operation of the mechanical override 100, the actuator 101, the gate valve 102, and the safe mode indicator 400 will now be described with reference to FIGS. 8-11. FIG. 8 illustrates the gate valve 102 in the fail-safe closed position. The spring 118 provides a force configured to bias the valve stem 114, the operator member 112, the top shaft 160, and the drive sleeve 204 in an upward direction, thereby positioning the sliding gate 116 in the closed position. Seating of the sliding gate 116 in the closed position limits the upward axial movement of the top shaft 160 and the drive sleeve 204. The mechanical override 100 is in an un-actuated position and does not interfere with the closing of the gate valve 102. The bias of the spring 118 raises the top shaft 160 to an extended position providing a visual indication that the gate valve 102 is in the closed position. The drive sleeve 204 is adjacent to and contacting the ball member 460, which forces the safe mode indicator 400 into the closed position such that it is in fluid communication with atmospheric pressure. The safe mode indicator 400 may provide a first visual indication that the gate valve 102 is not automatically actuated into the operating safe mode.

Figure 9:
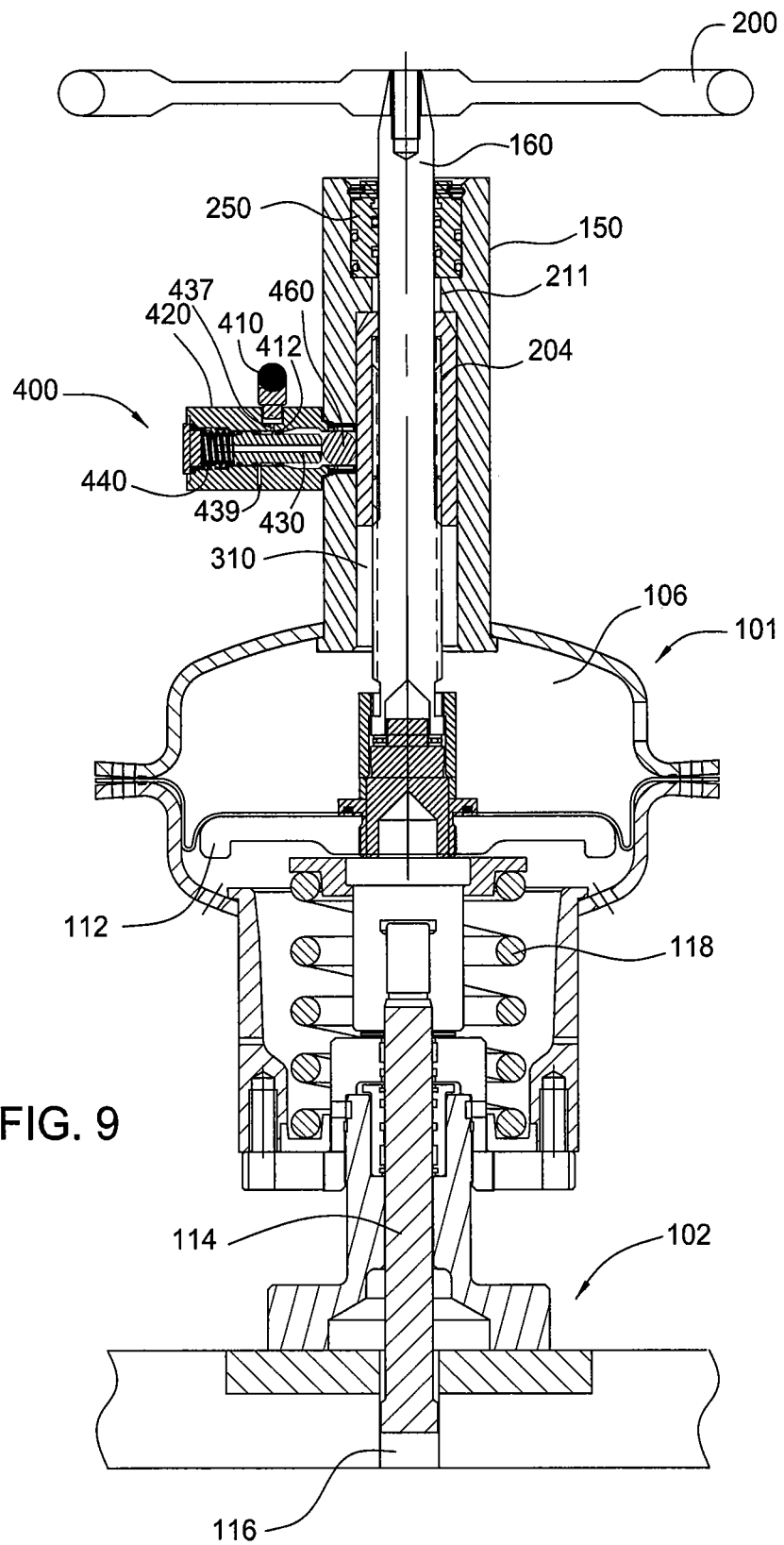
FIG. 9 is a sectional view of the gate valve in an open position after a manual operation of the mechanical override.

FIG. 9 illustrates the gate valve 102 in an open position after a manual operation the actuator 101 using the mechanical override 100. To move the sliding gate 116 to the open position using the mechanical override 100, the valve operator manually turns the handwheel 200 to provide rotation to the top shaft 160. Rotation of the handwheel 200 rotates the top shaft 160 to advance the top shaft 160 through the drive sleeve 204 across the length of the drive thread 214. As the top shaft 160 rotates, the top shaft 160 advances through the drive sleeve 204 until the upper portion of the drive thread 214 is located at the lower portion of the threaded bore 216 of the drive sleeve 204. During the manual operation, the inner shoulder 211 provides the backstop that prevents the drive sleeve 204 from moving relative to the housing 150. The manual rotation of the handwheel 200 mechanically advances the top shaft 160 through the housing 150 to either directly or indirectly axially move the valve stem 114 to place the gate valve 102 in the open position. The top shaft 160 is mechanically driven against the bias of the spring 118, thereby compressing the spring 118. The top shaft 160 lowers during the manual operation to a retracted position and provides a visual indication that the gate valve 102 is in the open position. The valve operator may also check the safe mode indicator 400 to determine whether the gate valve 102 is operating in the safe mode. Since the drive sleeve 204 has not been moved from its contact with the ball member 460, the communication by indication device 410 should not have changed during the operation of the gate valve 102 from the fail-safe closed position, shown in FIG. 1, to the open position by manual operation, shown in FIG. 2. Thus, the safe mode indicator 400 communicates the same first visual indication to the valve operator, which has not changed by the mechanical operation of the gate valve 102. The safe mode indicator 400 may therefore indicate that the gate valve 102 is not operating in the safe mode, has not been automatically actuated, has been actuated (at least partially) using the mechanical override 100, and/or may be prevented from moving into the fail-safe closed position.

Figure 10:
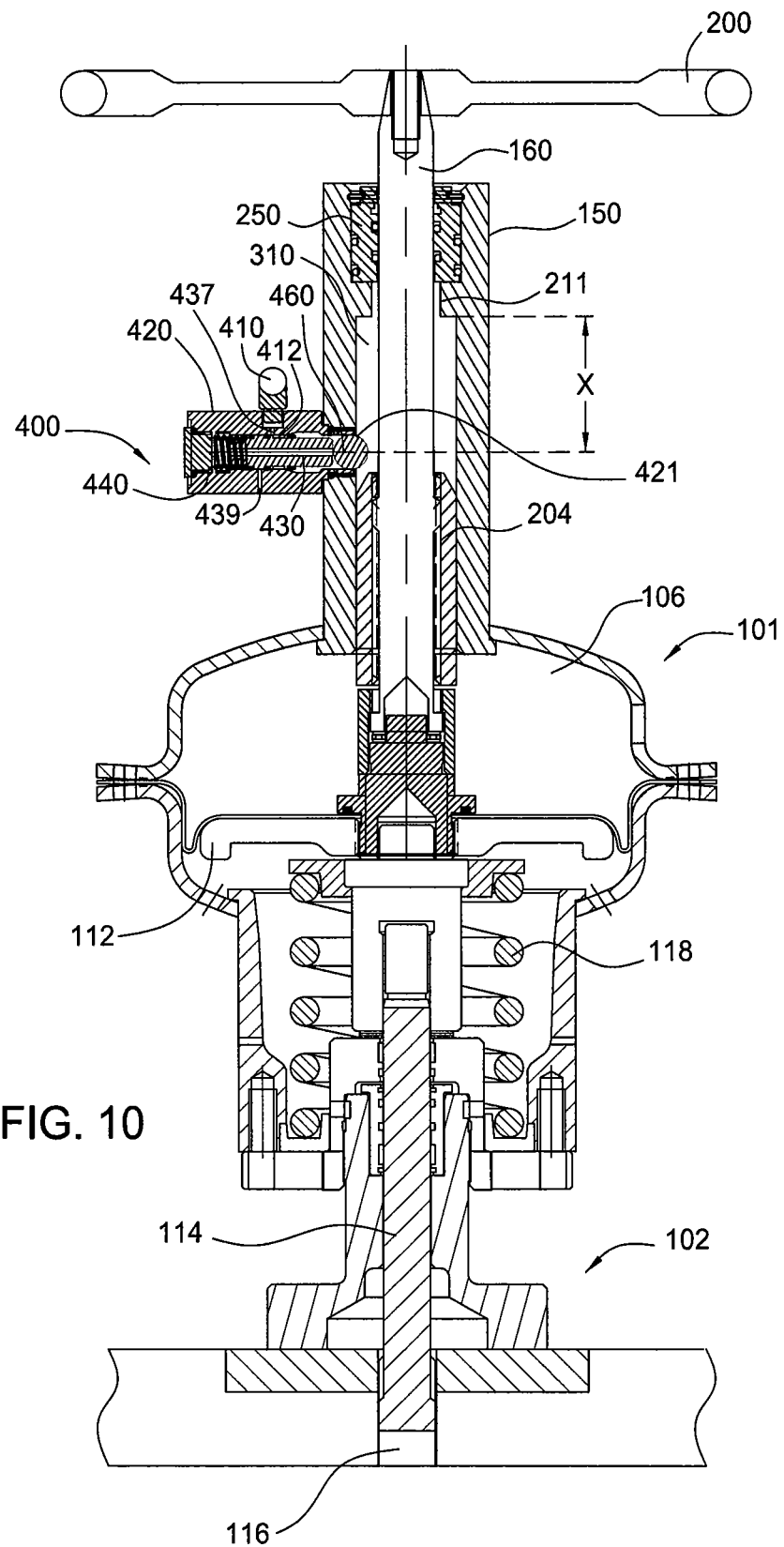
FIG. 10 is a sectional view of the gate valve in the open position after an automatic operation of the actuator and with the safe mode indicator indicating that the gate valve is operating in a safe mode.

FIG. 10 illustrates the gate valve 102 in the open position after an automatic operation of the actuator 101. Pressure is directed into the chamber 106 of the actuator 101 to overcome the bias of spring 118 and advance the top shaft 160, the drive sleeve 204, the operator member 112, and the valve stem 114 in a downward direction to position the sliding gate 116 into the open position. The top shaft 160 and the drive sleeve 204 are moved together axially within the bore of the housing 150 toward the gate valve 102, such that the drive sleeve 204 is moved out of contact with the ball member 460. The biasing member 430 moves the piston 430, the ball member 460, and the seal member 412 toward the housing 150. The seal member 412 is moved out of the tapered surface 433 area so that it does not sealingly engage the inner bore 425 of the housing 420. The safe mode indicator 400 is in the open position, and fluid communication is open between the chamber 106, the chamber 310, the bore 425 (via opening 421) and the port 437. The pressure in the chamber 106 may therefore be communicated to the indication device 410 to actuate the indication device 410. The pressure may also flow through the bore 435 of the piston 430 to equalize the pressure within the housing 150 and/or prevent any significant pressure differentials across the piston 430 and seal members 412, 413, 414. The pressure change in the actuator 101 actuates the safe mode indicator 400 or indication device 410 to communicate a second visual indication that is different than the first visual indication. Since the top shaft 160 also lowers during the automatic operation to the retracted position and provides a visual indication that the gate valve 102 is in the open position, the valve operator may use the safe mode indicator 400 to determine whether the gate valve 102 is operating in the safe mode. The second visual indication may therefore indicate that the gate valve 102 is operating in the safe mode, has not been mechanically actuated, has been automatically actuated, and/or will move into the fail-safe closed position upon release of pressure in the actuator 101. When operating in the safe mode, the upper end of the drive sleeve 204 is located at least at or below a distance X from the inner shoulder 211 of the housing 150. In this position, the drive sleeve 204 is located relative to the ball member 460 so that is does not move the safe mode indicator 400 to the closed position, and the mechanical override 100 will not disable or interfere with the fail safe mechanism of the actuator 101. When the pressure in the actuator 101 is released, the drive sleeve 204 is located a sufficient distance from the inner shoulder 211 so as not to limit upward axial movement of the top shaft 160 and thus the valve stem 114 and the sliding gate 116. In this manner, the sliding gate 116 may move into the fail-safe closed position.

Figure 11:
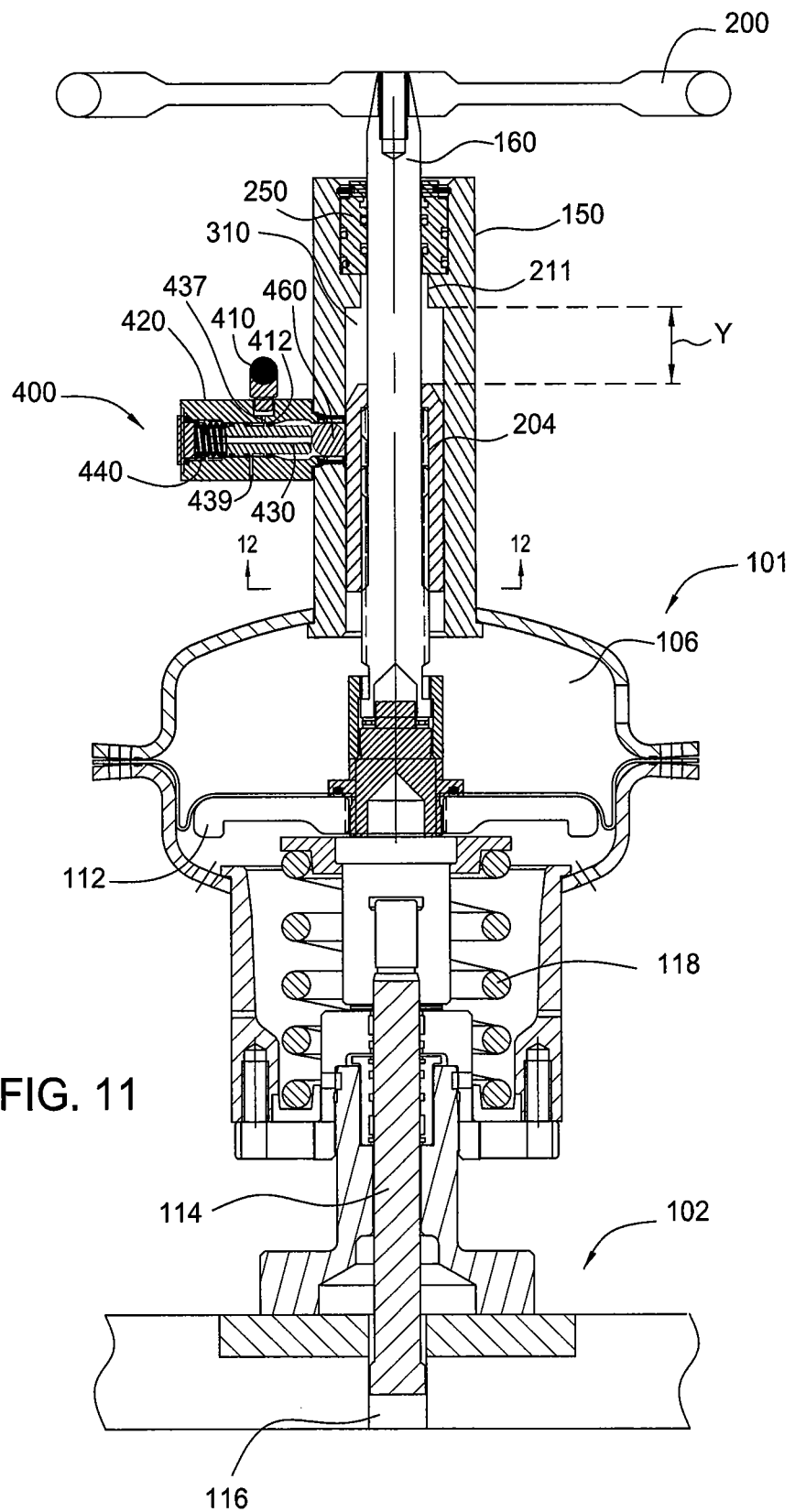
FIG. 11 is a sectional view of the gate valve in the open position after the automatic operation of the actuator, the mechanical override having been partially actuated, and the safe mode indicator indicating that the gate valve is not operating in the safe mode.

FIG. 11 illustrates the gate valve 102 in an open position after an automatic operation of the actuator 101 and a partial operation of the mechanical override 100. Before and/or after automatic actuation of the gate valve 102, the mechanical override 100 may be actuated at least partially, inadvertently or otherwise. If the handwheel 200 has been rotated one or more times, the top shaft 160 and the drive sleeve 204 will move relative to each other in an offset position illustrated in FIG. 11. When in the offset position and if the valve is automatically actuated, then the upper end of the drive sleeve 204 may be positioned a distance Y from the inner shoulder 211, which would prevent the gate valve 102 from moving to the fail-safe closed position. In one embodiment, the distance Y may be any distance that is less than the distance X identified in FIG. 10 such that the drive sleeve 204 engages the ball member 460 to move the safe mode indicator 400 into the closed position. When the pressure in the actuator 101 is released, the upper end of the drive sleeve 204 would backstop on the inner shoulder 211 before the sliding gate 116 closes, and limit the upward axial movement necessary to move the sliding gate 116 into the fail-safe closed position. Depending on the amount of offset between the drive sleeve 204 and the top shaft 160, the sliding gate 116 may be located in a partially open/closed position. Also, when in the gate valve 102 is automatically actuated and the drive sleeve 204 is located the distance Y from the inner shoulder 211, the chambers 106 and 310 remain isolated from fluid communication with the indication device 410 by the seal member 412. Any slight actuation of the mechanical override 100 may offset the top shaft 160 and the drive sleeve 204 enough to move the safe mode indicator 400 to the closed position during an automatic actuation of the actuator 101.

Since the top shaft 160 may still visually indicate that the valve 102 is in the open position in FIG. 11, the valve operator may also check the safe mode indicator 400 to determine whether the gate valve 102 is operating in the safe mode. The pressure in the chambers 106 and 310 is isolated from the indication device 410 by the seal member 412. Thus, the safe mode indicator 400 communicates the same first visual indication to the valve operator, which may have not changed by the automatic actuation of the gate valve 102. The safe mode indicator 400 may therefore indicate that the gate valve 102 is not operating in the safe mode, has been actuated (at least partially) using the mechanical override 100, and/or may be prevented from moving into the fail-safe closed position. While the actuator 101 is pressurized, the valve operator may rotate the handwheel 200 to advance the drive sleeve 204 toward the gate valve 102 and out of contact with the ball member 460 so that the gate valve 102 is operating in the safe mode. The valve operator may rotate the handwheel until the safe mode indicator 400 changes from the first visual indication to the second visual indication, e.g. when fluid communication is established between the chambers 106, 310 and the indication device 410, to ensure that the gate valve 102 is operating in the safe mode. Alternatively, the valve operator may release the pressure in the actuator 101 to permit the drive sleeve 204 to backstop against the inner shoulder 211, and then rotate the handwheel to move the mechanical override 100 into the un-actuated position so that the top shaft 160 and the drive sleeve 204 are not in an offset position as described above. The actuator 101 may be re-actuated automatically so that the safe mode indicator 400 indicates that the valve is operating in the safe mode.

Figure 12:
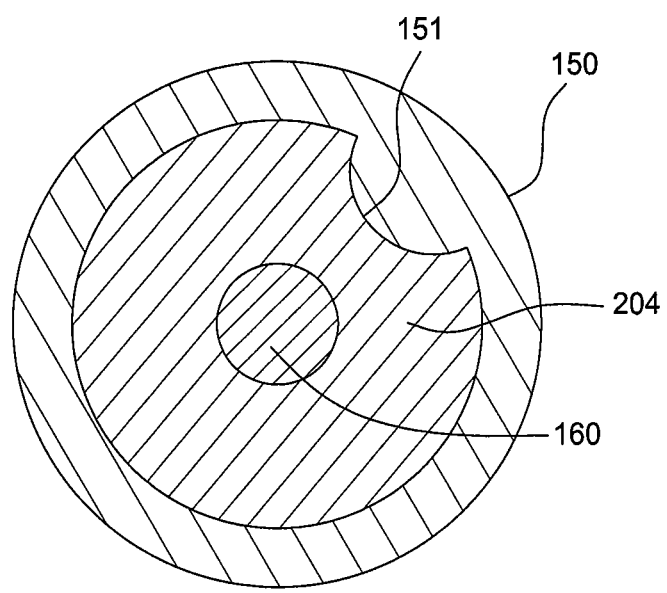
FIG. 12 is a cross-sectional view of the mechanical override along section line 12-12 in FIG. 11.

FIG. 12 illustrates a cross-section at sectional line 12-12 in FIG. 11 of a rotational locking assembly. FIG. 12 illustrates the inner diameter of the housing 150 having a spline or key portion 151, which is positioned within a recess or groove in the outer diameter of the drive sleeve 204 to rotationally lock the housing 150 and the drive sleeve 204. In one embodiment, the spline or key portion 151 may be welded to the inner surface of the housing 150. The splined or keyed engagement provides a physical interference that rotationally locks the drive sleeve 204 to the housing 150 without inhibiting axial movement of the drive sleeve 204 relative to the housing 150. The outer diameter of the drive sleeve 204 and/or the inner diameter of the housing 150 may be formed in any number of ways known by one of ordinary skill in the art to prevent relative rotational movement while permitting relative axial movement.

Figure 13A:
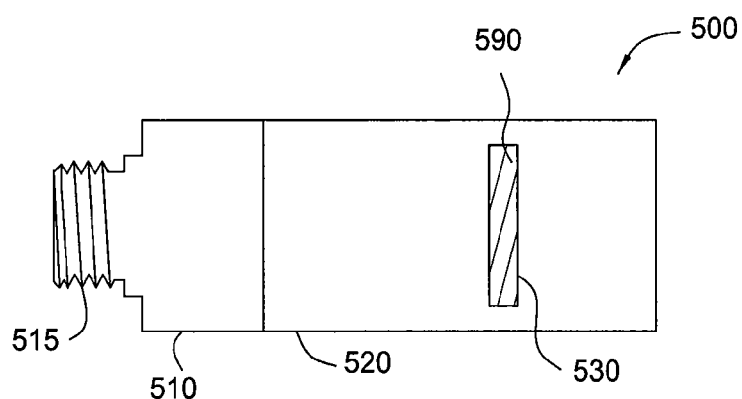
FIGS. 13A-13C illustrate a safe mode indicator according to one embodiment.
Figure 13C:
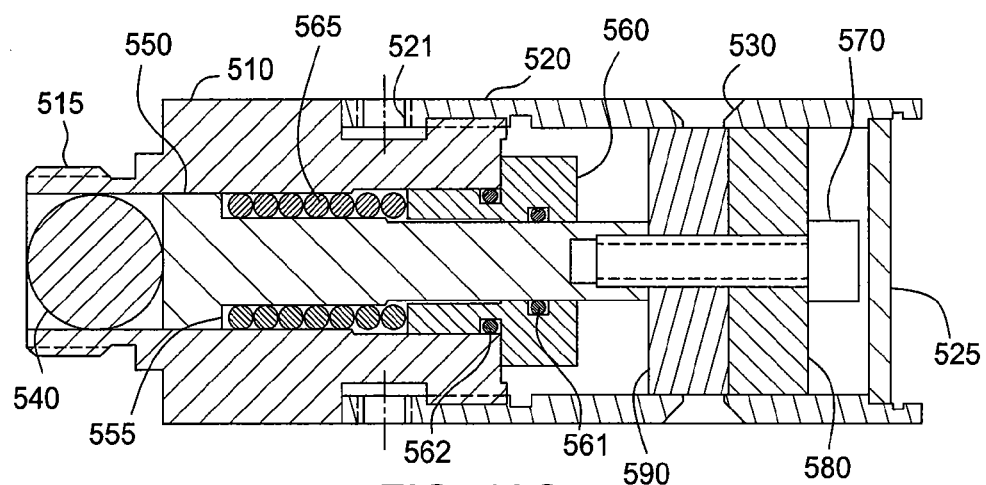
Figure 13B:
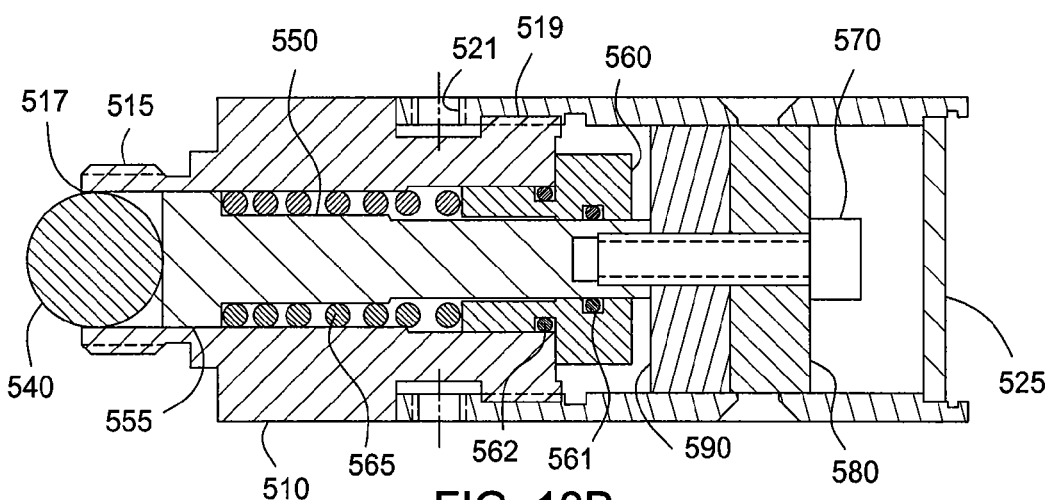

FIGS. 13A-13C illustrate a safe mode indicator 500 for use with the embodiments described herein and vice versa. The safe mode indicator 500 is similar to the indicators 103, 300, 400 and is operable to indicate whether the valve 102 and/or actuator 101 are operating in a safe mode. The safe mode indicator 500 may communicate that (1) the valve will move to the fail-safe closed position in the event of a pressure loss in the actuator, (2) the valve has been automatically actuated into the open position, and/or (3) the mechanical override will not disable or interfere with the fail-safe mechanism.

The safe mode indicator 500 includes a housing comprising a first housing member 510 coupled to a second housing member 520. In one embodiment, an outer diameter end of the first housing member 510 may be threadedly connected to an inner diameter portion of the second housing member 520, as illustrated by threaded connection 519. One or more set screws may be disposed through openings 521 in the body of the second housing member 520 and into engagement with first housing member 510 to prevent uncoupling of the first and second housing members 510, 520. The first housing member 510 may further include a threaded connection end 515 for coupling the safe mode indicator 500 to the housing 150 of the mechanical override 100. The second housing member 520 may include one or more openings 530 disposed through the body of the second housing member 520 for viewing one or more indicators 580, 590 as further described herein.

Enclosed within the safe mode indicator 500 are a contact member (such as ball member 540), a piston member 550, a plug member 560, a spring (such as biasing member 565), a pin member 570, and indicators 580, 590. The ball member 540, the piston member 550, the plug member 560, and the biasing member 565 may be fully or at least partially disposed in the bore of the first housing member 510. The ball member 460 may be of sufficient diameter such that a portion of the ball member 540 may extend out of the open end 517 of the first housing member 510 but cannot fit entirely through the open end 517. The inner edges of the open end 517 may be tapered to engage the outer surface of the ball member 540 and prevent removal of the ball member 540 through the open end 517.

In contact with the ball member 540 is the piston member 550, which includes a shoulder portion 555 for engagement with one end of the biasing member 565. The opposite end of the biasing member 565 engages the plug member 560, which is coupled to the end of the first housing member 510 opposite the open end 517. A portion of the plug member 560 may be threadedly coupled to the inner diameter of the bore of the first housing member 510 such that a shoulder of the plug member 560 abuts the end of the first housing member 510. A seal member 562 may provide a seal between the first housing member 510 and the plug member 560. The remaining portion of the piston member 550 may be disposed through the biasing member 565 and the bore of the plug member 560 for connection with the pin member 570, such as by a threaded connection. A seal member 561 may provide a seal between the piston member 550 and the plug member 560. In one embodiment, the pin member 570 may be a bolt or screw type member that threads into an end of the piston member 550. The pin member 570 may be disposed through the indicators 580, 590, which are secured between the piston member 550 and a head or shoulder portion of the pin member 570. In this manner, movement of the piston member 550 moves the pin member 570 and both the indicators 580, 590 within the bore of the second housing member 520 for viewing through the openings 530 of the second housing member 520. In one embodiment, the indicators 580, 590 may be in the form of a disc or other (circular) member that is easily securable and movable within the second housing member 520. Each indicator 580, 590 may also include a distinctive color or mark to provide a signal viewable through the openings 530 in the second housing member 520 corresponding to the position of the safe mode indicator 500 and thus the operating condition of the valve 102 and/or actuator 101. Finally, a closure member 525 may be coupled to the end of the second housing member 520 to enclose and protect the components therein.

FIG. 13B illustrates the safe mode indicator 500 when indicating that the valve 102 and/or actuator 101 are operating in a safe mode. In particular, the biasing member 565 biases the piston member 550 toward the open end 517, which pushes or forces the ball member 540 to partially extend outward of the open end 517 of the first housing member 510. The piston member 550 also moves or shifts the pin member 570 and the indicators 580, 590 relative to the second housing member 520 to a position where only the indicator 580 is visible through the openings 530. The drive sleeve 204 is in the position illustrated in FIG. 10 such that is does not contact the ball member 540 and is located at least at or below the distance X from the inner shoulder 211 of the housing 150. In this position, the drive sleeve 204 is located a sufficient distance from the inner shoulder 211 so that it will not inhibit fail safe closure of the valve 102.

When the safe mode indicator 500 is in the position illustrated in FIG. 13B, the indicator 580 is displayed through the openings 530. The indicator 580 may be a certain color, such as a green color, to indicate to an operator or other user that the valve 102 and/or actuator 101 are operating in a safe mode. The safe mode indicator 500 may continuously display the indicator 580 until the valve 102 and/or valve actuator 101 are moved to a position where they are not operating in the safe mode.

FIG. 13C illustrates the safe mode indicator 500 when indicating that the valve 102 and/or actuator 101 are not operating in the safe mode. In particular, ball member 540 is moved or forced into the bore of the first housing member 510 by contact with the drive sleeve 204. The drive sleeve 204 may be in the position illustrated in FIG. 11 for example or in any other position that is located less than the distance X from the inner shoulder 211 of the housing 150. In this position, the drive sleeve 204 is located a distance from the inner shoulder 211 that will inhibit fail safe closure of the valve 102. The ball member 540 moves the piston member 550 against the bias of the biasing member 565, which is compressed between the shoulder 555 of the piston member 550 and the end of the plug member 560. The piston member 550 also moves or shifts the pin member 570 and the indicators 580, 590 relative to the second housing member 520 to a position where only the indicator 590 is visible through the openings 530. The indicator 590 may be a certain color, such as a red color, to indicate to an operator or other user that the valve 102 and/or actuator 101 are not operating in the safe mode. The safe mode indicator 500 may continuously display the indicator 590 until the valve 102 and/or valve actuator 101 are moved to a position where they are operating in the safe mode as described above.

The safe mode indicator 500 is not limited to use with the mechanical override 100, the actuator 101, and/or the valve 102 described herein, but may be used with similar and/or other types of overrides, actuators, and/or valves. For example, the safe mode indicator 500 may be used with mechanical override systems that are sealed from fluid pressure. In one example, the safe mode indicator 500 may be coupled to an outer housing of a mechanical override system such that a drive sleeve of the mechanical override is movable into and out of contact with the ball member 540, thereby actuating the indicator 500 as described above. The outer housing of the mechanical override may be coupled to a housing of an actuator, such as by a threaded or welded connection, but may be sealed from fluid communication with the actuator. In one embodiment, the safe mode indicator 500 is a purely mechanically operated system that does not rely on any hydraulic, pneumatic, and/or electric power supply or source. Additional embodiments of the safe mode indicators 103, 300, 400 and/or 500, however, may include one or a combination of mechanical, fluid, electric powered type systems.

In one embodiment, the top shaft 160 may be provided with a mark (or other similar type of indication, such as a notch in the outer diameter) located along its length such that the mark is visible only when the valve 102, the actuator 101, and/or the mechanical override 100 are in a fully closed position. For example, a mark may be provided on the outer diameter of the top shaft 160 that is visible slightly above the housing 150 when the top shaft 160 is in the position illustrated in FIG. 1 or in a fully extended position. In FIG. 1, the valve 102 is in the fully closed position. An operator or other user may view the mark as an indication that the valve 102 is in the fully closed position. Movement of the top shaft 160 into the housing 150 will also move the mark into the housing 150 an out of view from the operator or user. When the mark is not visible, the operator or user may use this as an indication that the valve 102 is not in the fully closed position. The mark on the top shaft 160 may be used alone or in combination with the other embodiments described herein to determine the operational state of the valve 102, the actuator 101, and/or the mechanical override 100.

While the foregoing is directed to embodiments of the invention, other and further embodiments of the invention may be devised without departing from the basic scope thereof, and the scope thereof is determined by the claims that follow.

The invention claimed is:

1. An indicator apparatus, comprising:
a housing having a bore disposed therethrough;
a piston movable within the housing;
a biasing member operable to move the piston to a first position;
a contact member operable to move the piston to a second position against the bias of the biasing member; and
an indicator coupled to the piston, wherein the indicator provides a signal viewable through an opening in the housing when the piston is moved to the first position and a different signal viewable through the opening when the piston is moved to the second position, wherein the indicator comprises a first disc member that provides the signal viewable when the piston is in the first position, and a second disc member that provides the different signal viewable when the piston is in the second position.

2. The apparatus of claim 1, wherein the housing comprises a first housing member threadedly coupled to an inner diameter portion of a second housing member.

3. The apparatus of claim 1, further comprising a plug member coupled to the housing, wherein the biasing member is disposed between a shoulder of the piston and an end of the plug member.

4. The apparatus of claim 1, wherein the biasing member biases the piston into contact with the contact member, and wherein a portion of the contact member is disposed outside of the bore of the housing when the piston is in the first position.

5. The apparatus of claim 1, wherein the contact member comprises a ball member that is movably disposed within the bore of the housing to move the piston against the bias of the biasing member.

6. The apparatus of claim 1, wherein the signal is a color of the first disc member, and the different signal is a color of the second disc member.

7. The apparatus of claim 6, wherein the first and second disc members are coupled to the piston by a pin member that is threadedly connected to the piston.

8. A valve assembly, comprising:
a valve;
a hydraulic or pneumatic actuator operable to actuate the valve to an open position and a closed position, wherein the actuator comprises a fail-safe mechanism operable to move the valve to the closed position upon loss or release of fluid pressure in the actuator;
a mechanical override operable to actuate the valve to the open position and the closed position, wherein actuation of the valve using the mechanical override prevents the valve from moving to the closed position by the fail-safe mechanism; and
an indication apparatus operable to indicate whether the valve is operating in a fail-safe mode, the indication apparatus comprising:
a housing having a bore disposed therethrough;
a piston movable within the housing;
a biasing member operable to move the piston to a first position;
a contact member operable to move the piston to a second position against the bias of the biasing member; and
an indicator coupled to the piston, wherein the indicator provides a signal viewable through an opening in the housing when the piston is moved to the first position and a different signal viewable through the opening when the piston is moved to the second position; and
wherein a drive sleeve of the mechanical override contacts the contact member to move the contact member and the piston to the second position, and wherein when the piston is in the second position, the signal viewable through the opening in the housing indicates that the valve is not operating in the fail-safe mode.

9. The valve assembly of claim 8, wherein actuation of the valve using the hydraulic or pneumatic actuator moves the drive sleeve from contact with the contact member so that the biasing member moves the piston to the first position, and wherein when the piston is in the first position, the signal viewable through the opening in the housing indicates that the valve is operating in the fail-safe mode.

10. The valve assembly of claim 8, further comprising a shaft coupled to the valve and having a mark formed on its outer surface that is only viewable when the valve is in the closed position.

11. A valve assembly, comprising:
a valve;
a hydraulic or pneumatic actuator operable to actuate the valve to an open position and a closed position, wherein the actuator comprises a fail-safe mechanism operable to move the valve to the closed position upon loss or release of fluid pressure in the actuator;
a shaft coupled to the valve and having a mark formed on its outer surface that is only viewable when the valve is in the closed position;
a mechanical override operable to actuate the valve to the open position and the closed position; and
an indication apparatus operable to indicate whether the valve is operating in a fail-safe mode, the indication apparatus comprising:
a housing having a bore disposed therethrough;
a piston movable within the housing;
a biasing member operable to move the piston to a first position;
a contact member operable to move the piston to a second position against the bias of the biasing member; and
an indicator coupled to the piston, wherein the indicator provides a signal viewable through an opening in the housing when the piston is moved to the first position and a different signal viewable through the opening when the piston is moved to the second position.

* * * * *